(12) United States Patent
Matsushima et al.

(10) Patent No.: US 11,079,345 B2
(45) Date of Patent: Aug. 3, 2021

(54) X-RAY INSPECTION DEVICE

(71) Applicant: RIGAKU CORPORATION, Akishima (JP)

(72) Inventors: Naoki Matsushima, Tokyo (JP); Kiyoshi Ogata, Tokyo (JP); Kazuhiko Omote, Tokyo (JP); Sei Yoshihara, Saitama (JP); Yoshiyasu Ito, Tokyo (JP); Hiroshi Motono, Tokyo (JP); Hideaki Takahashi, Tokyo (JP); Akifusa Higuchi, Tokyo (JP); Shiro Umegaki, Tokyo (JP); Shigematsu Asano, Tokyo (JP); Ryotaro Yamaguchi, Saitama (JP); Katsutaka Horada, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 16/958,556

(22) PCT Filed: Sep. 5, 2018

(86) PCT No.: PCT/JP2018/032810
§ 371 (c)(1),
(2) Date: Jun. 26, 2020

(87) PCT Pub. No.: WO2019/130663
PCT Pub. Date: Jul. 4, 2019

(65) Prior Publication Data
US 2021/0063326 A1  Mar. 4, 2021

(30) Foreign Application Priority Data

Dec. 28, 2017 (JP) .............................. JP2017-253019

(51) Int. Cl.
  G01N 23/20016   (2018.01)
  G01N 23/207    (2018.01)

(52) U.S. Cl.
  CPC ..... *G01N 23/20016* (2013.01); *G01N 23/207* (2013.01); *G01N 2223/056* (2013.01);
  (Continued)

(58) Field of Classification Search
  None
  See application file for complete search history.

(56) References Cited

U.S. PATENT DOCUMENTS

| 6,301,330 B1 * | 10/2001 | Kurtz ..................... G01N 23/20 257/E21.53 |
| 9,063,064 B2 | 6/2015 | Nomura |
| 2004/0190681 A1 * | 9/2004 | Omote ................... G01N 23/20 378/71 |
| 2005/0025281 A1 | 2/2005 | Verman et al. |

(Continued)

FOREIGN PATENT DOCUMENTS

| JP | 2-302653 A | 12/1990 |
| JP | 2003-506673 A | 2/2003 |

(Continued)

OTHER PUBLICATIONS

International Search Report dated Nov. 20, 2018, issued in counterpart International Application No. PCT/JP2018/032810. (2 pages).

*Primary Examiner* — Hoon K Song
(74) *Attorney, Agent, or Firm* — Westerman, Hattori, Daniels & Adrian, LLP

(57) ABSTRACT

An X-ray inspection device of the present invention includes a sample placement unit 11 for placing a sample as an inspection target therein, a sample placement unit positioning mechanism 30 for moving the sample placement unit 11, a goniometer 20 including first and second rotation members 22, 23 that rotate independently of each other, an X-ray irradiation unit 40 installed on the first rotation member 22, and a two-dimensional X-ray detector 50 installed on the
(Continued)

second rotation member 23. The sample placement unit positioning mechanism 30 includes a χ rotation mechanism 35 for rotating the sample placement unit 11 and a φ-axis about a χ-axis that is orthogonal to a θs-axis and a θd-axis at a measurement point P and extends horizontally.

8 Claims, 14 Drawing Sheets

(52) U.S. Cl.
CPC .......... *G01N 2223/331* (2013.01); *G01N 2223/3306* (2013.01); *G01N 2223/3308* (2013.01); *G01N 2223/50* (2013.01); *G01N 2223/6116* (2013.01)

(56) References Cited

U.S. PATENT DOCUMENTS

| | | | |
|---|---|---|---|
| 2006/0088139 A1* | 4/2006 | Nakano | G01N 23/20016 378/79 |
| 2012/0275567 A1* | 11/2012 | Hasegawa | G01N 1/42 378/80 |
| 2015/0103980 A1 | 4/2015 | Kaercher | |
| 2017/0363550 A1 | 12/2017 | Kobayashi et al. | |
| 2019/0227005 A1* | 7/2019 | Ogata | G01N 23/207 |

FOREIGN PATENT DOCUMENTS

| | | |
|---|---|---|
| JP | 2006-153767 A | 6/2006 |
| JP | 2013-210377 A | 10/2013 |
| JP | 2013-257298 A | 12/2013 |
| JP | 2017-223539 A | 12/2017 |
| WO | 2004/114325 A2 | 12/2004 |

* cited by examiner

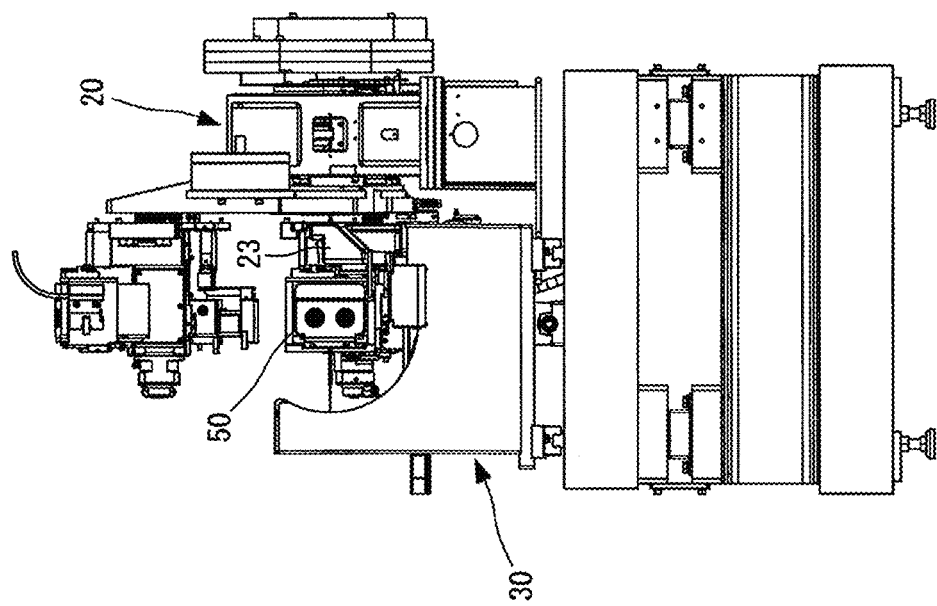
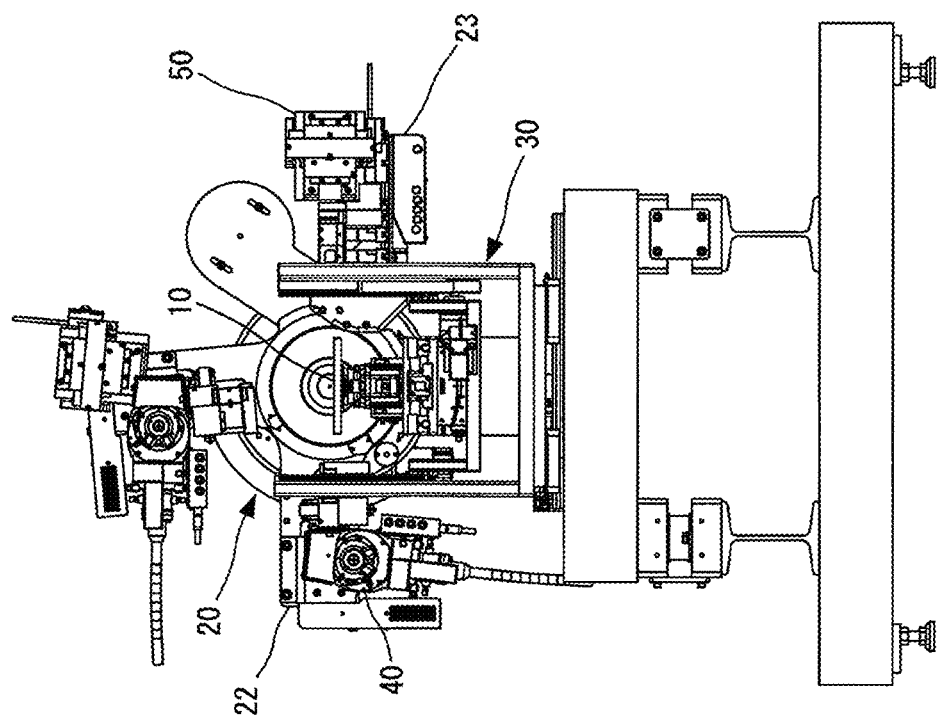

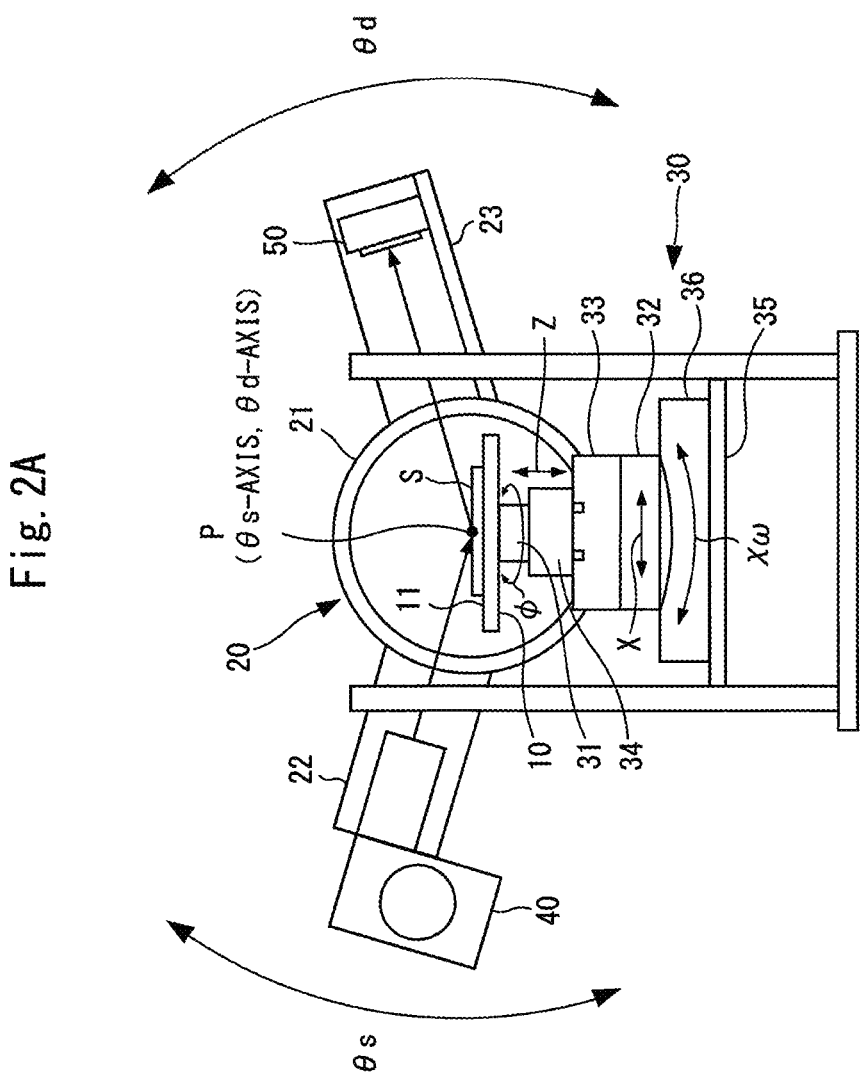
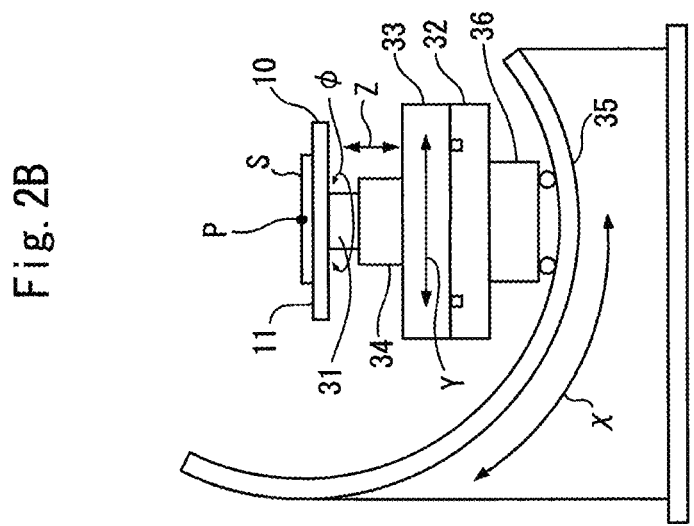
Fig. 2A
Fig. 2B

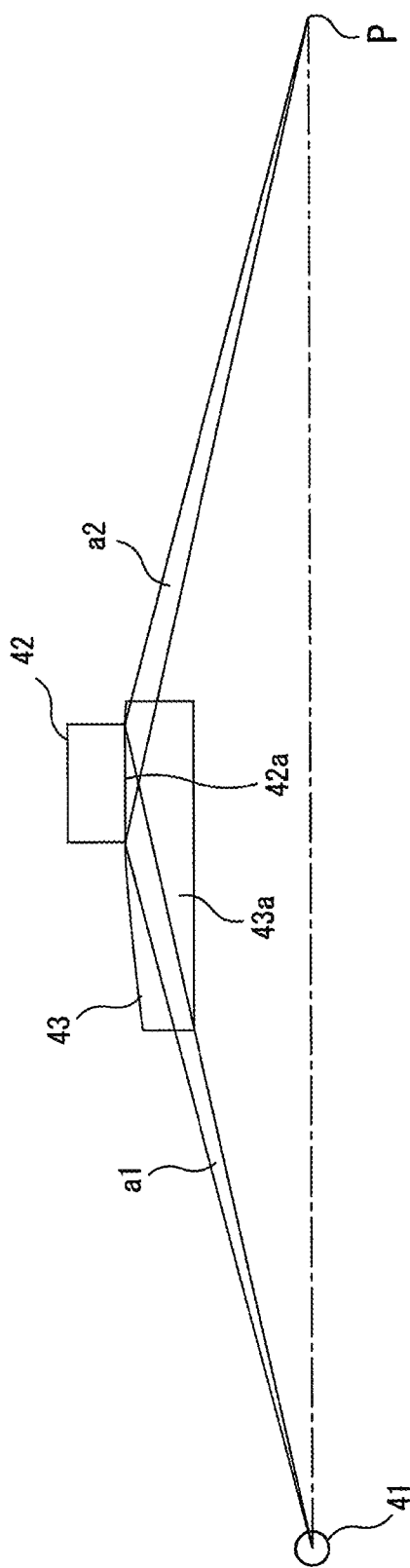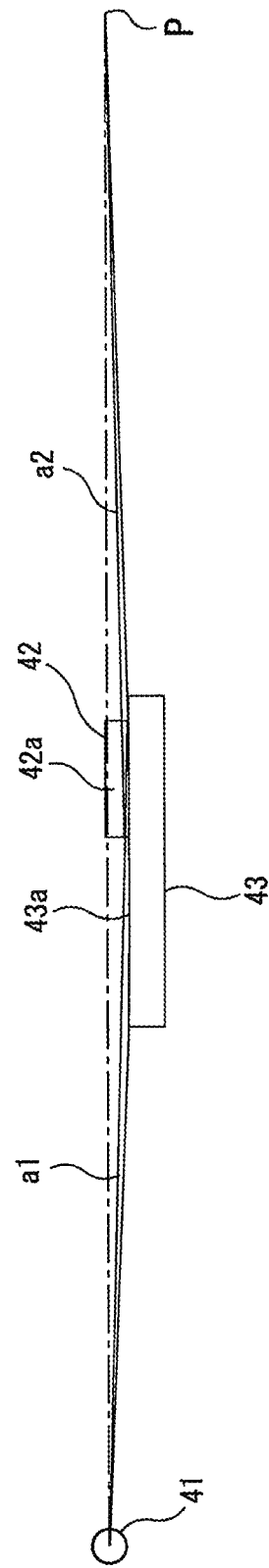

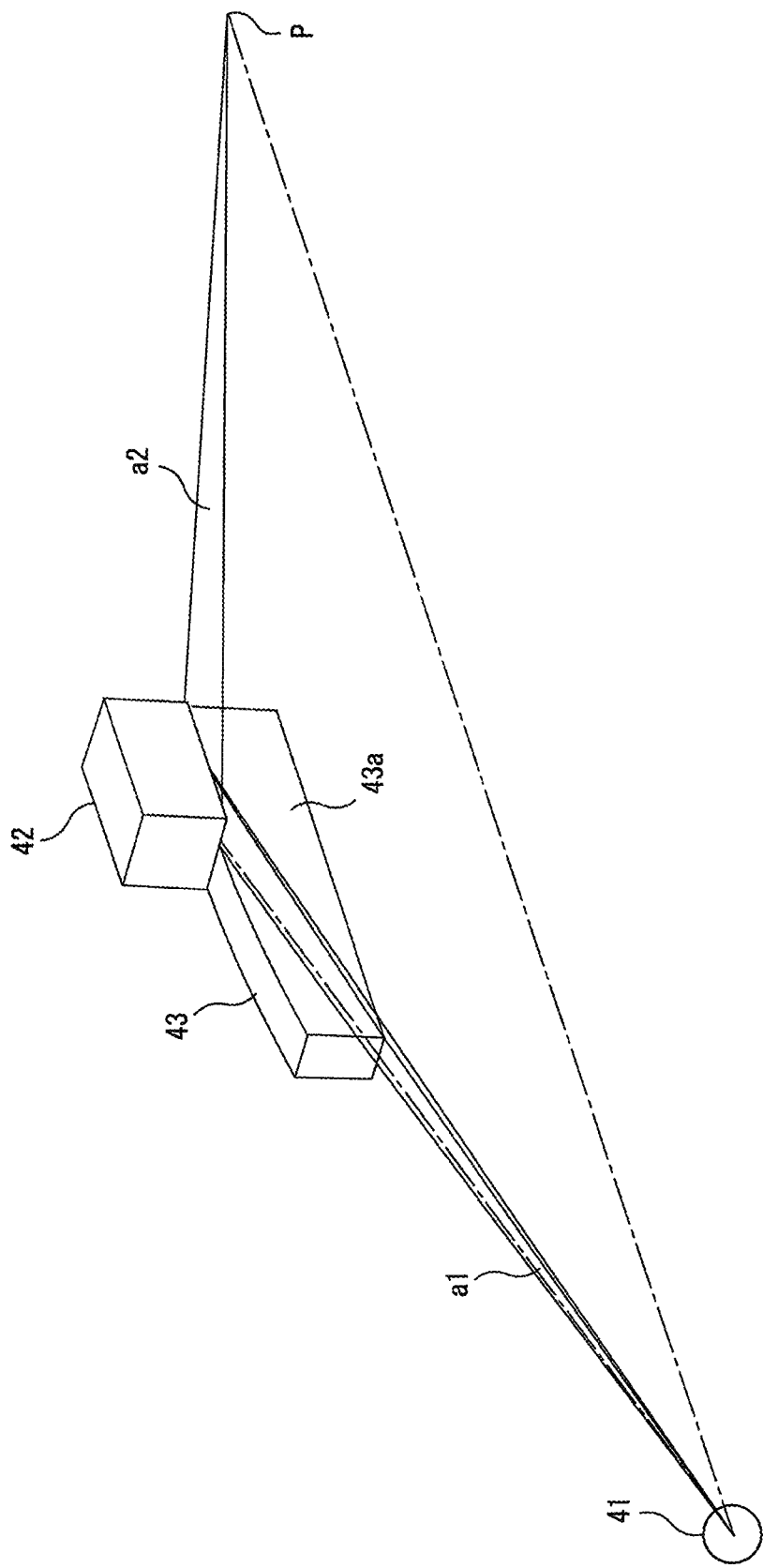

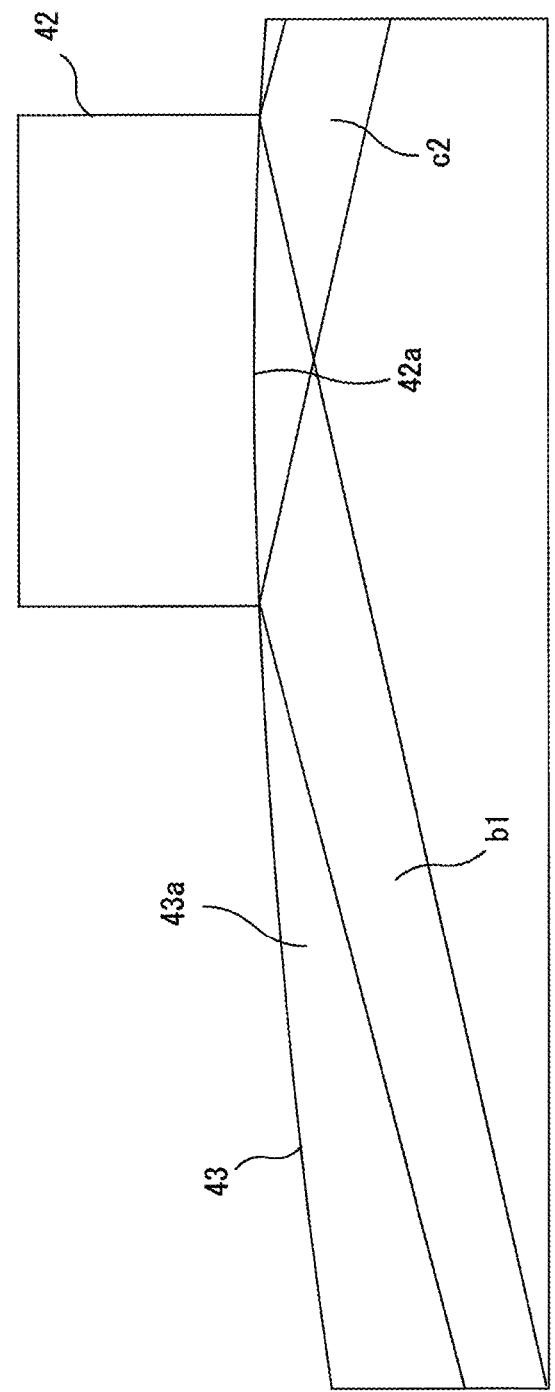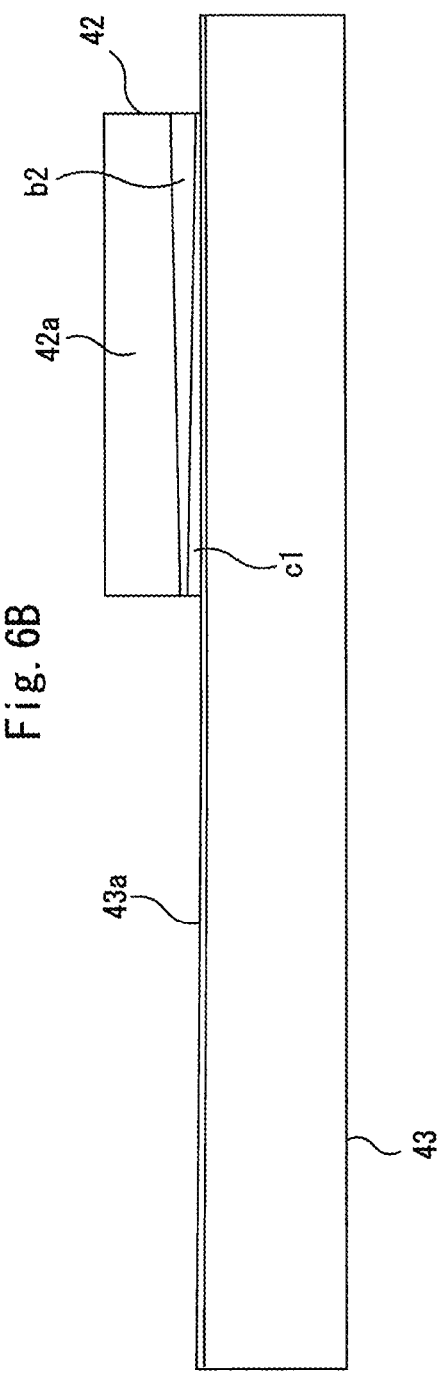

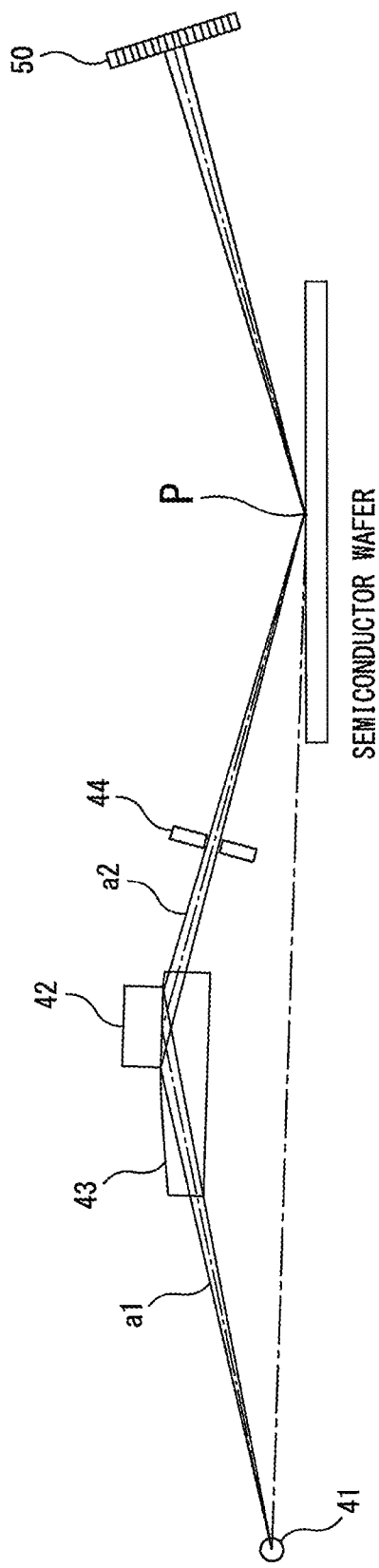
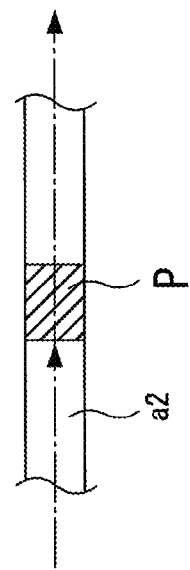

X-RAY INSPECTION DEVICE

TECHNICAL FIELD

The present invention relates to an X-ray inspection device suitable for use in a semiconductor manufacturing field, etc., such as a technical field for manufacturing an element having a multilayer structure in which multiple thin films are laminated on a substrate.

BACKGROUND ART

The characteristics of a semiconductor, etc., such as an element having a multilayer structure in which multiple thin films are laminated on a substrate vary according to the state of a thin film to be formed, such as the film thickness, density, crystallinity, etc. of the thin film. Microfabrication and integration of these elements have recently progressed, and this tendency has become remarkable. Therefore, a thin film inspection device capable of accurately measuring the states of formed films has been required.

As this type of inspection device has been known direct measurement based on a cross-sectional transmission electron microscope (TEM), a film thickness inspection device using optical interference or ellipsometry, a photoacoustic device, etc. The present situation of the cross-sectional transmission electron microscope (TEM) is that it is impossible to install the cross-sectional transmission electron microscope in an in-line manufacturing process and inspect a thin film as an inspection target in real time, and also a product which is extracted for an inspection from the manufacturing line is discarded after the inspection. Furthermore, the film thickness inspection device using optical interference or ellipsometry and the photoacoustic device are suitable for the in-line process, but have insufficient precision for measurements of thin films of several nm.

Wafers for inspection which are discarded after used (blanket wafers) have imposed a large burden in cost on semiconductor device makers. Particularly, the diameter of semiconductor wafers has recently increased, so that the cost of one blanket wafer has also increased.

In view of the situation as described above, the applicant of the present application has previously proposed an in-line type X-ray thin film inspection device that is installable in a process of manufacturing film-formed products, and can directly inspect the products themselves and inspect even thin films of several nm with sufficient precision without discarding wafers after the inspection (see Patent Document 1).

PRIOR ART DOCUMENTS

Patent Documents

Patent Document 1: Japanese Patent Laid-open Application No. 2006-153767
Patent Document 2: Japanese Patent Laid-open Application No. 2013-210377
Patent Document 3: International Publication No. WO2004/114325

DISCLOSURE OF THE INVENTION

Problem to be Solved by the Invention

Further, in the technical field of today's advanced LSI (Large-Scale Integration), strict measurement of lattice strain, stress, composition ratio, film thickness, etc. of SiGe and compound semiconductors is being needed. In addition, strict measurement of the crystallinity of compound semiconductor thin films such as III-V group and II-VI group used in optical devices such as LEDs and semiconductor lasers (LD) and piezoelectric thin films used in MEMS and the like is also being increasingly needed, and developments of X-ray inspection devices meeting these needs are being required.

In order to adapt to these applications and realize highly efficient in-line inspection, it is essential that, for example, X-ray diffraction measurement, rocking curve measurement or the like that captures in-plane diffraction in X-ray diffraction can be performed with high accuracy and high throughput. However, there has been no conventional in-line type X-ray inspection device that can perform X-ray measurement capturing these in-plane diffractions with high accuracy.

It is an object of the present invention to provide an in-line type X-ray inspection device that is incorporated in a manufacturing process and can measure the above-mentioned X-ray measurement capturing in-plane diffraction with high accuracy and high efficiency.

Means of Solving the Problem

An X-ray inspection device according to the present invention comprising:

a sample placement unit for placing a sample as an inspection target;

a sample placement unit positioning mechanism for moving the sample placement unit;

a goniometer including first and second rotation members that rotate independently of each other;

an X-ray irradiation unit that is installed on the first rotation member and irradiates X-rays focusing onto a preset measurement point; and a two-dimensional X-ray detector installed on the second rotation member.

Here, the goniometer includes:

a $\theta s$ rotation mechanism for rotating the first rotation member around a $\theta s$-axis that passes through the measurement point and extends in a horizontal direction to set an incident angle of X-rays from the X-ray irradiation unit to the sample placed in the sample placement unit; and a $\theta d$ rotation mechanism for rotating the second rotation member around a $\theta d$-axis coincident with the $\theta s$-axis to set a scanning angle of the X-ray detector.

Further, the sample placement unit positioning mechanism includes:

a $\phi$ rotation mechanism for rotating the sample placement unit around a $\phi$-axis orthogonal to a surface of the sample placed in the sample placement unit;

an X movement mechanism for linearly moving the sample placement unit and the $\phi$-axis in an X direction intersecting perpendicularly to the $\theta s$-axis and the $\theta d$-axis;

a Y movement mechanism for linearly moving the sample placement unit and the $\phi$-axis in a Y direction intersecting perpendicularly to the X direction;

a Z movement mechanism for moving the sample placement unit in a Z direction orthogonal to the surface of the sample placed in the sample placement unit;

a $\chi$ rotation mechanism for rotating the sample placement unit and the $\phi$-axis around a $\chi$-axis that is orthogonal to the $\theta s$-axis and the $\theta d$-axis at the measurement point and extends in the horizontal direction; and a χω rotation mechanism that rotates the sample placement unit and the φ-axis around a χω-axis that is orthogonal to the χ-axis at the measurement point and extends in parallel to the surface of the sample placed in the sample placement unit, and is rotated around the χ-axis by the χ rotation mechanism.

Further, the X-ray irradiation unit is configured to focus X-rays in a lateral direction that intersects perpendicularly to an optical axis of the X-rays and is parallel to the θs-axis, and also focus X-rays in a longitudinal direction that intersects perpendicularly to an optical axis of the X-rays and intersects perpendicularly to the θs-axis.

According to the X-ray inspection device of the present invention having the above-mentioned configuration, the χ rotation mechanism is driven to irradiate the surface of the sample with focused X-rays from the X-ray irradiation unit in a state where the surface of the sample placed in the sample placement unit is vertically oriented, and the incident angle of the X-rays to the sample is changed by the θs rotation mechanism, whereby the rocking curve measurement of in-plane diffraction can be performed.

Here, since diffracted X-rays appearing at a diffraction angle within a certain range from the surface of the sample can be detected in a lump by the two-dimensional X-ray detector, the measurement with high throughput can be realized.

In addition, since the surface of the sample is irradiated with the X-rays which are focused in the form of a minute spot by the X-ray irradiation unit, high-resolution and high-precision measurement can be performed by detecting the diffracted X-rays appearing from the minute spot.

The X-ray irradiation unit is preferably configured to focus X-rays within 100 μm or less, to full width at half maximum of the peak, in each of the lateral direction and the longitudinal direction at the measurement point.

The Y movement mechanism is preferably configured so that a direction (Y direction) in which the sample placement unit is moved in a state where the sample placement unit is horizontally arranged by the χ rotation mechanism is parallel to the θs-axis and the θd-axis. With such a configuration, it is also possible for the Y movement mechanism to have a function as a sample exchange mechanism for arranging the sample placement unit at a preset sample exchange position by moving (horizontally moving) the sample placement unit in the Y direction.

Further, the Y movement mechanism is configured so that the direction in which the sample placement unit is moved by the Y movement mechanism (that is, Y direction) is parallel to the θs-axis that is a rotation center of the first rotation member and the θd-axis that is a rotation center of the second rotation member, so that the sample placement unit can be horizontally moved to the sample exchange position without interfering with a rotation path of the X-ray irradiation unit installed on the first rotation member and a rotation path of the two-dimensional X-ray detector installed on the second rotation member. Therefore, it is possible to perform a so-called in-line X-ray inspection which is incorporated in a manufacturing process for a film-formed product and inspects a thin film as an inspection target in real time.

Further, since the Y movement mechanism has a function as the sample exchange mechanism, a movement distance in the Y direction becomes longer, so that the Y movement mechanism must be increased in size. Therefore, in the X-ray inspection device of the present invention, the φ rotation mechanism is installed on the Y movement mechanism to reduce a torque required to drive the φ rotation mechanism. As a result, it is possible to reduce the size of the φ rotation mechanism and realize smooth driving with a small amount of electric power.

The X-ray inspection device of the present invention may be configured to include a controller having a control function of controlling the sample placement unit positioning mechanism, the goniometer including the first and second rotation members, and the X-ray irradiation unit to perform a rocking curve measurement of in-plane diffraction.

At this time, the controller is configured to have a control function of:

driving the χ rotation mechanism to vertically orient the surface of the sample placed in the sample placement unit;

driving the Z movement mechanism to align an inspection target site of the sample placed in the sample placement unit with a height of the measurement point;

driving the φ rotation mechanism, the X movement mechanism and the Y movement mechanism to position the inspection target site of the sample at the measurement point in a preset direction;

further driving the θs rotation mechanism and the χω rotation mechanism to irradiate X-rays from the X-ray irradiation unit in a direction that is nearly parallel to the surface of the sample, driving the θd rotation mechanism interlockingly with the θs rotation mechanism to arrange the two-dimensional X-ray detector at a position where diffracted X-rays appearing from the sample according to Bragg's law are detected; and driving the θs rotation mechanism to change an incident angle of X-rays to the sample and perform a rocking curve measurement of in-plane diffraction.

Further, the controller may be configured as follows. In other words, the controller may be configured to have a control function of:

driving the χ rotation mechanism to vertically orient the surface of the sample placed in the sample placement unit;

driving the Z movement mechanism to align an inspection target site of the sample placed in the sample placement unit with a height of the measurement point;

driving the φ rotation mechanism, the X movement mechanism and the Y movement mechanism to position the inspection target site of the sample at the measurement point in a preset direction;

further driving the θs rotation mechanism to irradiate X-rays from the X-ray irradiation unit in a direction that is nearly parallel to the surface of the sample;

driving the θd rotation mechanism interlockingly with the θs rotation mechanism to arrange the two-dimensional X-ray detector at a position where diffracted X-rays appearing from the sample according to Bragg's law are detected; and driving the φ rotation mechanism and interlocking the X movement mechanism and the Y movement mechanism the driving of the φ rotation mechanism to change an incident angle of X-rays to the sample while holding an inspection target site of the sample at the measurement point, thereby performing a rocking curve measurement of in-plane diffraction.

Still further, the controller may be configured as follows. In other words, the controller may be configured to have a control function of:

driving the χ rotation mechanism to vertically orient the surface of the sample placed in the sample placement unit;

driving the Z movement mechanism to align an inspection target site of the sample placed in the sample placement unit with a height of the measurement point;

driving the φ rotation mechanism, the X movement mechanism and the Y movement mechanism to position the inspection target site of the sample at the measurement point in a preset direction;

further driving the θs rotation mechanism and the χω rotation mechanism to irradiate X-rays from the X-ray irradiation unit in a direction that is nearly parallel to the surface of the sample;

driving the θd rotation mechanism interlockingly with the θs rotation mechanism to arrange the two-dimensional X-ray detector at a position where diffracted X-rays appearing from the sample according to Bragg's law are detected; and performing a rocking curve measurement of in-plane diffraction within a range of a focusing angle of X-rays that are focused and incident from the X-ray irradiation unit to the sample.

With this configuration, it is possible to perform the rocking curve measurement of in-plane diffraction in a short time without driving the θs rotation mechanism to change the incident angle of X-rays to the sample and driving the φ rotation mechanism to minutely rotate the sample in the in-plane direction (φ direction), and the measurement with high throughput can be realized.

Further, the X-ray inspection device of the present invention may be configured to include a controller having a control function of controlling the sample placement unit positioning mechanism, the goniometer including the first and second rotation members, and the X-ray irradiation unit to perform an in-plane diffraction measurement.

Here, the controller is configured to have a control function of:

driving the χ rotation mechanism to vertically orient the surface of the sample placed in the sample placement unit;

driving the Z movement mechanism to align an inspection target site of the sample placed in the sample placement unit with a height of the measurement point;

driving the φ rotation mechanism, the X movement mechanism and the Y movement mechanism to position the inspection target site of the sample at the measurement point in a preset direction;

further driving the θs rotation mechanism and the χω rotation mechanism to irradiate X-rays from the X-ray irradiation unit in a direction that is nearly parallel to the surface of the sample; and driving the θd rotation mechanism interlockingly with the θs rotation mechanism to arrange the two-dimensional X-ray detector at a position where diffracted X-rays appearing from the sample according to Bragg's law are detected, thereby performing an in-plane diffraction measurement.

Further, the X-ray inspection device of the present invention may be configured to include a controller having a control function of controlling the sample placement unit positioning mechanism, the goniometer including the first and second rotation members, and the X-ray irradiation unit to perform a pole measurement.

At this time, the controller is configured to have a control function of driving the χ rotation mechanism to rotate the surface of the sample placed in the sample placement unit about the χ-axis, thereby setting a tilt angle α for the pole measurement within a range of 0° to 90°, and driving the φ rotation mechanism to rotate the surface of the sample placed in the sample placement unit about the φ-axis, thereby setting an in-plane rotation angle β for the pole measurement, whereby the pole measurement is performed.

According to the present invention described above, it is possible to highly-precisely and highly-efficiently perform X-ray measurement which is incorporated in a manufacturing process and captures in-plane diffraction in-line.

BRIEF DESCRIPTION OF THE DRAWINGS

FIG. 1A is a front view showing an overall structure of an X-ray inspection device according to an embodiment of the present invention, and FIG. 1B is a side view of the same.

FIG. 2A is a front view schematically showing a main structure of the X-ray inspection device according to the embodiment of the present invention, and FIG. 2B is a side view of the same.

FIG. 4A is a front view schematically showing a configuration of an X-ray irradiation unit according to the embodiment of the present invention, and FIG. 4B is a bottom view of the same.

FIG. 5 is a perspective view of the X-ray irradiation unit shown in FIGS. 4A and 4B.

FIG. 6A is an enlarged front view showing a first X-ray optical element and a second X-ray optical element included in the X-ray irradiation unit shown in FIGS. 4A, 4B and 5, and FIG. 6B is a bottom view of the same.

FIG. 7A is a front view schematically showing a path of X-rays irradiated from the X-ray irradiation unit onto an inspection surface of a semiconductor wafer and a path of diffracted X-rays which are reflected from the inspection surface and incident to an X-ray detector, and FIG. 7B is an enlarged plan view showing a portion of a measurement point P in FIG. 7A.

DESCRIPTION OF REFERENCE SIGNS

Figure 3:
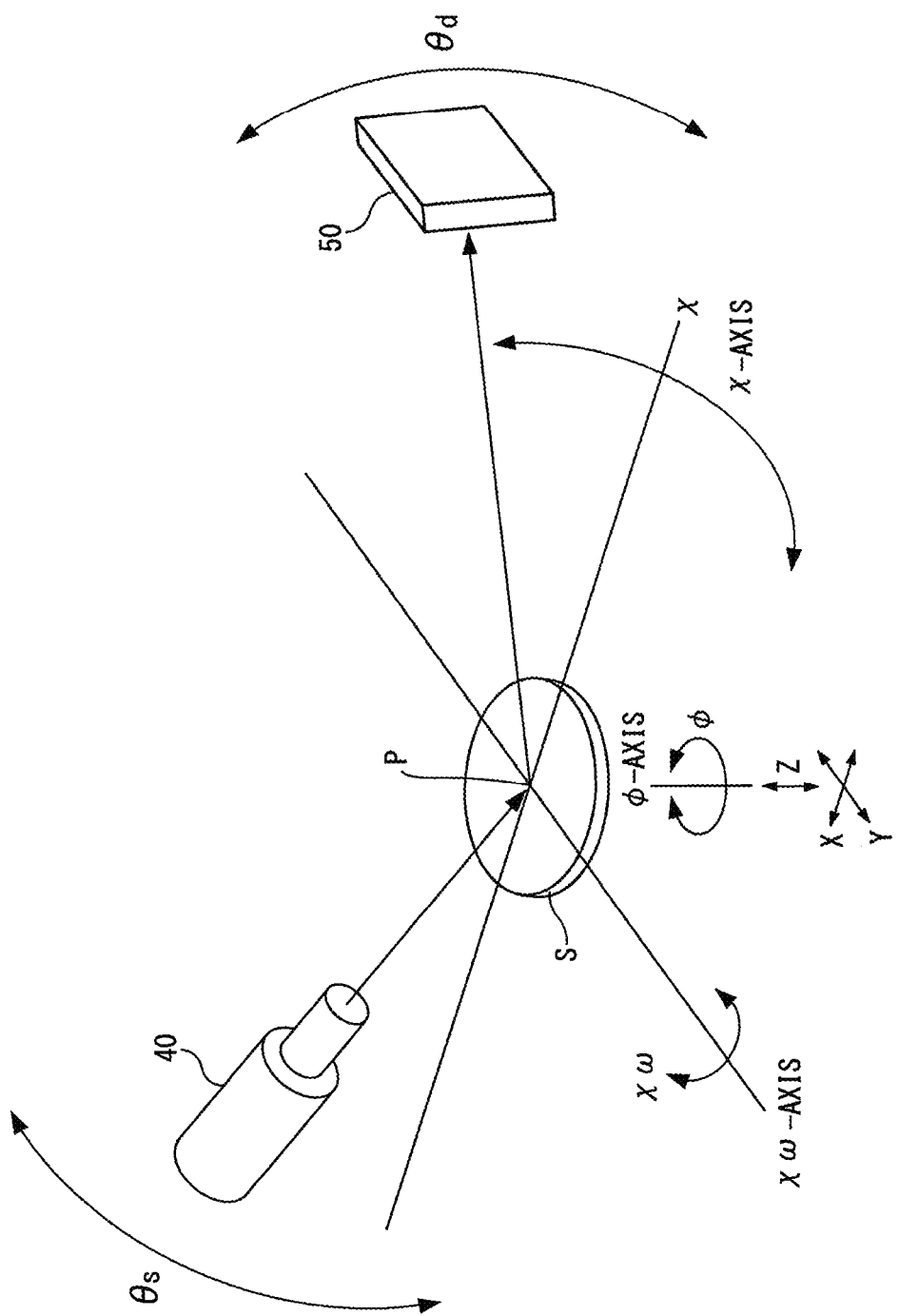
FIG. 3 is a diagram schematically showing a moving direction of a sample placement unit by a sample placement unit positioning mechanism.

S: sample, P: measurement point,
10: sample stage, 11: sample placement unit,
20: goniometer, 21: goniometer main body, 22: first rotation arm, 23: second rotation arm, 30: positioning mechanism, 31: φ rotation mechanism, 32: X movement mechanism, 33: Y movement mechanism, 34: Z movement mechanism, 35: χ rotation mechanism, 36: χω rotation mechanism, 40: X-ray irradiation unit, 41: X-ray tube, 42: first X-ray optical element, 43: second X-ray optical element, 44: focusing slit, 50: X-ray detector, 100: central processing unit, 101: XG controller, 102: positioning controller, 103: goniometer controller, 104: counting control circuit, 110: storage unit, 201: operation unit, 202: display unit, 203: communication unit

BEST MODE FOR CARRYING OUT THE INVENTION

Hereinafter, an embodiment of the present invention will be described in detail with reference to the drawings.

[Basic Configuration of X-Ray Inspection Device]

FIGS. 1A and 1B are diagrams showing an overall structure of an X-ray inspection device according to an embodiment of the present invention. FIGS. 2A and 2B are diagrams schematically showing a main structure of the device.

As shown in these figures, the X-ray inspection device according to the embodiment of the present invention includes a sample stage 10, a goniometer 20, a sample placement unit positioning mechanism (which may be simply referred to as "positioning mechanism" below) 30, an X-ray irradiation unit 40, and an X-ray detector 50.

A sample placement unit 11 is formed on an upper surface of the sample stage 10. A semiconductor wafer (sample S) as an inspection target is placed in the sample placement unit 11. The sample stage 10 is driven by the positioning mechanism 30. A measurement point P is set in advance in the X-ray inspection device. By driving the sample stage 10 with the positioning mechanism 30, a measurement target site of the sample S placed in the sample placement unit 11 is positioned at the measurement point P.

A mechanism (not shown) for fixing the sample S is installed in the sample placement unit 11. This sample fixing mechanism prevents the sample S from falling off the sample placement unit 11 even when the surface of the sample placement unit 11 (the upper surface of the sample stage 10) is vertically oriented as described later.

As the fixing mechanism for the sample S may be adopted, for example, a configuration in which a plurality of suction nozzles are opened on the surface of the sample placement unit 11, and hollow portions of the suction nozzles are vacuum-sucked by a suction device such as a vacuum pump, whereby the sample S is adsorbed on the sample placement unit 11. Of course, a publicly known sample fixing mechanism other than the above mechanism may be adopted.

The goniometer 20 includes a θs rotation mechanism and a θd rotation mechanism incorporated in the goniometer main body 21.

The θs rotation mechanism rotates a first rotation arm (rotation member) 22 in a direction of an arrow θs in FIG. 2A about a θs-axis that passes through a preset measurement point P and extends in a horizontal direction. The X-ray irradiation unit 40 is installed on the first rotation arm 22. An incident angle of X-rays from the X-ray irradiation unit 40 to the sample S is set by the movement of the first rotation arm 22.

Further, the θd rotation mechanism rotates a second rotation arm (rotation member) 23 in a direction of an arrow θd in FIG. 2A about a θd-axis that passes through the preset measurement point P and extends in the horizontal direction. The X-ray detector 50 is installed on the second rotation arm 23. A scanning angle of the X-ray detector 50 is set by the movement of the first rotation arm 22. In other words, the movement of the first rotation arm 22 causes the X-ray detector 50 to be arranged at a position where diffracted X-rays appearing from the surface of the sample S according to the Bragg's law are detected.

The above-mentioned θs-axis and θd-axis are rotation center axes on the same axis.

The positioning mechanism 30 includes a φ rotation mechanism 31, an X movement mechanism 32, a Y movement mechanism 33, a Z movement mechanism 34, a χ rotation mechanism 35, and a χω rotation mechanism 36 for moving the sample placement unit 11 in respective directions.

FIG. 3 is a diagram schematically showing the moving directions of the sample placement unit 11 by the positioning mechanism 30. The positioning mechanism 30 will be described with reference to FIG. 3 and FIGS. 2A and 2B.

The φ rotation mechanism 31 rotates the sample placement unit 11 in a direction of an arrow φ in the figure about a φ-axis orthogonal to the surface of the sample S placed in the sample placement unit 11.

The X movement mechanism 32 linearly moves the sample placement unit 11 and the φ-axis in an X direction intersecting perpendicularly to the θs-axis and the θd-axis.

The Y movement mechanism 33 linearly moves the sample placement unit 11 and the φ-axis in a Y direction intersecting perpendicularly to the X direction.

The Z movement mechanism 34 moves the sample placement unit 11 in a Z direction orthogonal to the surface of the sample S placed in the sample placement unit 11.

The χ rotation mechanism 35 rotates the sample placement unit 11 and the φ-axis in a direction of an arrow χ in the figure around a χ-axis that is orthogonal to the θs-axis and the θd-axis at the measurement point P and extends horizontally.

The χω rotation mechanism 36 rotates the sample placement unit 11 and the φ-axis in a direction of an arrow χω in the figure around a χω-axis that is orthogonal to the χ-axis at the measurement point P and extends in parallel to the surface of the sample placed in the sample placement unit 11. Further, the χω rotation mechanism 36 is rotated in a direction of an arrow χ in the figure around the χ-axis by the χ rotation mechanism 35.

A sample exchange position (not shown) is preset in the X-ray inspection device. The sample placement unit 11 formed on the upper surface of the sample stage 10 is transported to this sample exchange position. At the sample exchange position, a sample exchange device (not shown) such as a robot arm takes out an inspected sample S from the sample placement unit 11 and places a new sample S as an inspection target in the sample placement unit 11.

In the X-ray inspection device of the present embodiment, the Y movement mechanism 33 is configured to function as a sample exchange mechanism for moving the sample placement unit 11 to the sample exchange position.

Here, a direction in which the sample placement unit 11 is moved while the sample placement unit 11 is horizontally arranged by the χ rotation mechanism 35 (Y direction) is set to be in parallel to the θs-axis and the θd-axis. The sample exchange position is set on a movement path on which the sample placement unit 11 is moved in the direction.

As described above, by moving the sample placement unit 11 in the direction parallel to the θs-axis and the θd-axis, it is possible to move the sample placement unit 11 to the sample exchange position without interfering with the first rotation arm 22 having the X-ray irradiation unit 40 installed thereon and the second rotation arm 23 having the X-ray detector 50 installed thereon.

On the other hand, since the Y movement mechanism 33 has a function as the sample exchange mechanism, the movement distance in the Y direction increases, so that the Y movement mechanism 33 must be increased in size. Therefore, it is intended in the X-ray inspection device of the present embodiment that the φ rotation mechanism 31 is installed on the Y movement mechanism 33 to reduce the torque required to drive the φ rotation mechanism 31. As a result, the φ rotation mechanism 31 can be decreased in size and smoothly driven with a small amount of electric power.

The X-ray inspection device of the present embodiment is configured so that the χω rotation mechanism 36, the X movement mechanism 32, the Y movement mechanism 33, the Z movement mechanism 34, the φ rotation mechanism 31 and the sample stage 10 are installed on the χ rotation mechanism 35 as shown in FIGS. 1A to 2B. Specifically, the X-ray inspection device is configured so that the χω rotation mechanism 36 is rotated around the χ-axis by the χ rotation mechanism 35. The X movement mechanism 32 and the Y movement mechanism 33 are installed on the χω rotation mechanism 36. Further, the Z movement mechanism 34 is installed on the Y movement mechanism 33. Further, the φ rotation mechanism 31 is installed on the Z movement mechanism 34. Still further, the sample stage 10 is installed on the φ rotation mechanism 31.

The X-ray irradiation unit 40 has a function of monochromatizing X-rays generated from an X-ray tube into characteristic X-rays having a specific wavelength and also focusing the X-rays on one place.

An X-ray irradiation path of the X-ray irradiation unit 40 is adjusted so that focusing X-rays are irradiated onto a preset measurement point P. As described above, a measurement target site of the sample S placed in the sample placement unit 11 is positioned at the measurement point P.

The detailed structure of the X-ray irradiation unit 40 will be described later.

A two-dimensional X-ray detector is adopted as the X-ray detector 50. The two-dimensional X-ray detector has a two-dimensionally configured planar X-ray detector, and can collectively record diffracted X-rays appearing from the surface of the sample S in this planar X-ray detector. Therefore, the two-dimensional X-ray detector has a feature that the time required for measurement can be shortened as compared with a one-dimensional X-ray detector such as a proportional counter (PC) or a scintillation counter (SC).

Further, there has been recently developed a two-dimensional semiconductor detector in which a large number of silicon semiconductor elements each having an extremely small pixel size of 100 μm or less are arrayed in the X-ray detector, and X-rays can be detected with high positional resolution in a short time and with high accuracy by these semiconductor elements. By adopting this type of two-dimensional semiconductor detector as the X-ray detector 50, it will be possible to implement highly efficient and highly accurate X inspection in an in-line manner in a manufacturing process.

Configuration Example of X-Ray Irradiation Unit

Next, the X-ray irradiation unit will be described in detail with reference to FIGS. 4A to 7B.

The X-ray irradiation unit 40 shown in FIGS. 4A to 7B includes an X-ray tube 41, a first X-ray optical element 42, a second X-ray optical element 43, and a focusing slit 44 (slit member) as constituent elements. These constituent elements are incorporated in a unit main body (not shown). The unit main body is configured to be small in dimension and shape so that it is installable in the first rotation arm 22.

The focusing slit 44 is shown only in FIG. 7A, and omitted in FIGS. 4A, 4B and 5.

For example, a micro focus X-ray tube having an electron beam focus size of about φ100 μm on a target may be used as the X-ray tube 41. Copper (Cu), molybdenum (Mo), iron (Fe), cobalt (Co), tungsten (W), chromium (Cr), silver (Ag), gold (Au) or the like may be used as a target material as required.

Particularly when copper (Cu) is used as the target material, only characteristic X-rays of Cu-Kα1 having high angular resolution can be extracted by first and second X-ray optical elements 42 and 43 described later. Accordingly, X-ray thin film inspection can be performed with excellent throughput by irradiating a sample with the characteristic X-rays of Cu-Kα1.

The first and second X-ray optical elements 42 and 43 have a function of receiving X-rays a1 radiated from the X-ray tube 41, extracting only characteristic X-rays having a specific wavelength and focusing the extracted characteristic X-ray a2 on the surface of a sample placed on the sample stage 10.

As shown in FIGS. 4A to 7B, the first X-ray optical element 42 and the second X-ray optical element 43 are arranged so that surfaces 42a and 43a thereof which receive X-rays and reflect characteristic X-rays (hereinafter merely referred to as "surfaces") are orthogonal to each other. As shown in FIG. 7A, the first X-ray optical element 42 and the second X-ray optical element 43 focus the characteristic X-rays a2 having the specific wavelength so that the characteristic X-rays a2 form a square minute spot on the surface of the sample placed on the sample stage 10. FIG. 7B is an enlarged plan view schematically showing a position at which the characteristic X-rays a2 are focused on the surface of the sample (semiconductor wafer).

In the present embodiment, the first X-ray optical element 42 and the second X-ray optical element 43 are arranged in a side-by-side manner in which one sides thereof are in contact with each other. However, the present invention is not limited to this arrangement, and they may be arranged in an in-series manner called as Kirkpatrick-Baez (KB).

A position at which the characteristic X-rays reflected and extracted by the first and second X-ray optical elements 42 and 43 are focused on the surface of the sample placed on the sample stage 10 is a measurement point P. In order to focus the characteristic X-rays on the measurement point P as described above, the respective surfaces 42a and 43a of the X-ray optical elements 42 and 43 are formed to be concavely curved.

Here, the first X-ray optical element 42 focuses X-rays in a longitudinal direction that is orthogonal to the optical axis of the X-rays and orthogonal to the θs-axis.

Further, the second X-ray optical element 43 focuses the X-rays in a lateral direction that is orthogonal to the optical axis of the X-rays and parallel to the θs-axis.

Furthermore, the first X-ray optical element 42 is constituted by a crystal material having high crystallinity. In other words, the first X-ray optical element 42 is constituted by a crystal material having an extremely small inherent rocking curve width (that is, angular range in which a parallel beam can be reflected). Crystal materials corresponding to perfect crystals having extremely little lattice defect and impurities correspond to the crystal material having the extremely small inherent rocking curve width as described above.

In the present embodiment, the first X-ray optical element 42 is constituted by a crystal material having an inherent rocking curve width of 0.06° or less. By using the characteristic X-rays a2 extracted from the crystal material described above, high angular resolution of 0.06° or less can be obtained in X-ray thin film measurements.

For example, Ge (111) or Si (111) may be used as the crystal material. When Ge (1 1 1) is used, a rocking curve width of 0.06° or less is obtained. In addition, when Si (1 1 1) is used, a rocking curve width of 0.02° or less is obtained.

Further, according to the first X-ray optical element 42, X-rays can be focused within 100 μm or less, to full width at half maximum of the peak, in the longitudinal direction at the measurement point P.

In addition, the first X-ray optical element 42 has a function of extracting only characteristic X-rays having a specific wavelength and monochromatizing the extracted characteristic X-rays.

Furthermore, the second X-ray optical element 43 is constituted by a multilayer mirror. The second X-ray optical element 43 has a function of extracting only characteristic X-rays having a specific wavelength and monochromatizing the extracted characteristic X-rays. Here, the second X-ray optical element 43 is adjusted so as to extract the characteristic X-rays having the same wavelength as the characteristic X-rays extracted by the first X-ray optical element 42.

Further, according to the second X-ray optical element 43, X-rays can be focused within 100 μm or less, to full width at half maximum of the peak, in the lateral direction at the measurement point P.

As enlarged and viewed in FIGS. 6A and 6B, X-rays b1 which are emitted from the X-ray tube 41 and incident to the surface 43a of the second X-ray optical element 43 are monochromatized and reflected by the X-ray optical element 43, travel so as to be focused in the lateral direction, and then are incident to the surface 42a of the first X-ray optical element 42. Then, X-rays b2 incident to the surface 42a of the first X-ray optical element 42 are monochromatized and reflected by the X-ray optical element 42, travel so as to be focused in the longitudinal direction, and are irradiated to the measurement point P shown in FIGS. 4A and 4B.

On the other hand, X-rays c1 which are emitted from the X-ray tube 41 and incident to the surface 42a of the first X-ray optical element 42 are monochromatized and reflected by the X-ray optical element 42, travel so as to be focused in the longitudinal direction, then are incident to the surface 43a of the second X-ray optical element 43. Then, X-rays c2 incident to the surface 43a of the second X-ray optical element 43 travel so as to be focused in the lateral direction, and then are irradiated to the measurement point P shown in FIGS. 4A and 4B.

As described above, X-rays a1 emitted from the X-ray tube 41 are reflected once by each of the surface 42a of the first X-ray optical element 42 and the surface 43a of the second X-ray optical element 43, and during this process, only characteristic X-rays a2 having a specific wavelength are extracted, and the characteristic X-rays a2 are focused on the measurement point P.

Incidentally, the aforementioned Patent Document 2 and Patent Document 3 disclose an X-ray beam adjustment system configured by combining a perfect crystal and multilayer optical components. However, these documents do not disclose a configuration which is optimized for an X-ray inspection device using a semiconductor wafer as an inspection target sample.

The focusing slit 44 is arranged so as to partially shield the characteristic X-rays a2 reflected by the first and second X-ray optical elements 42 and 43 from both sides in the longitudinal direction described above. The focusing slit 44 has a function of restricting the focusing in the longitudinal direction of the focusing X-rays a2 reflected by the first and second X-ray optical elements 42 and 43.

According to the X-ray inspection device in which the X-ray irradiation unit 40 having the aforementioned configuration is installed on the first rotation arm 22, X-rays can be focused on a minute area by the first X-ray optical element 42, the second X-ray optical element 43 and the focusing slit 44. Accordingly, it is possible to perform a thin film measurement by irradiating X-rays to an extremely minute inspection area on the surface of a semiconductor wafer. In addition, since the first X-ray optical element 42 is constituted by a crystal material having an extremely small inherent rocking curve width, extremely high angular resolution can be obtained in the X-ray thin film measurement by using characteristic X-rays a2 extracted with the crystal material as described above.

[Control System of X-Ray Inspection Device]

Figure 8:
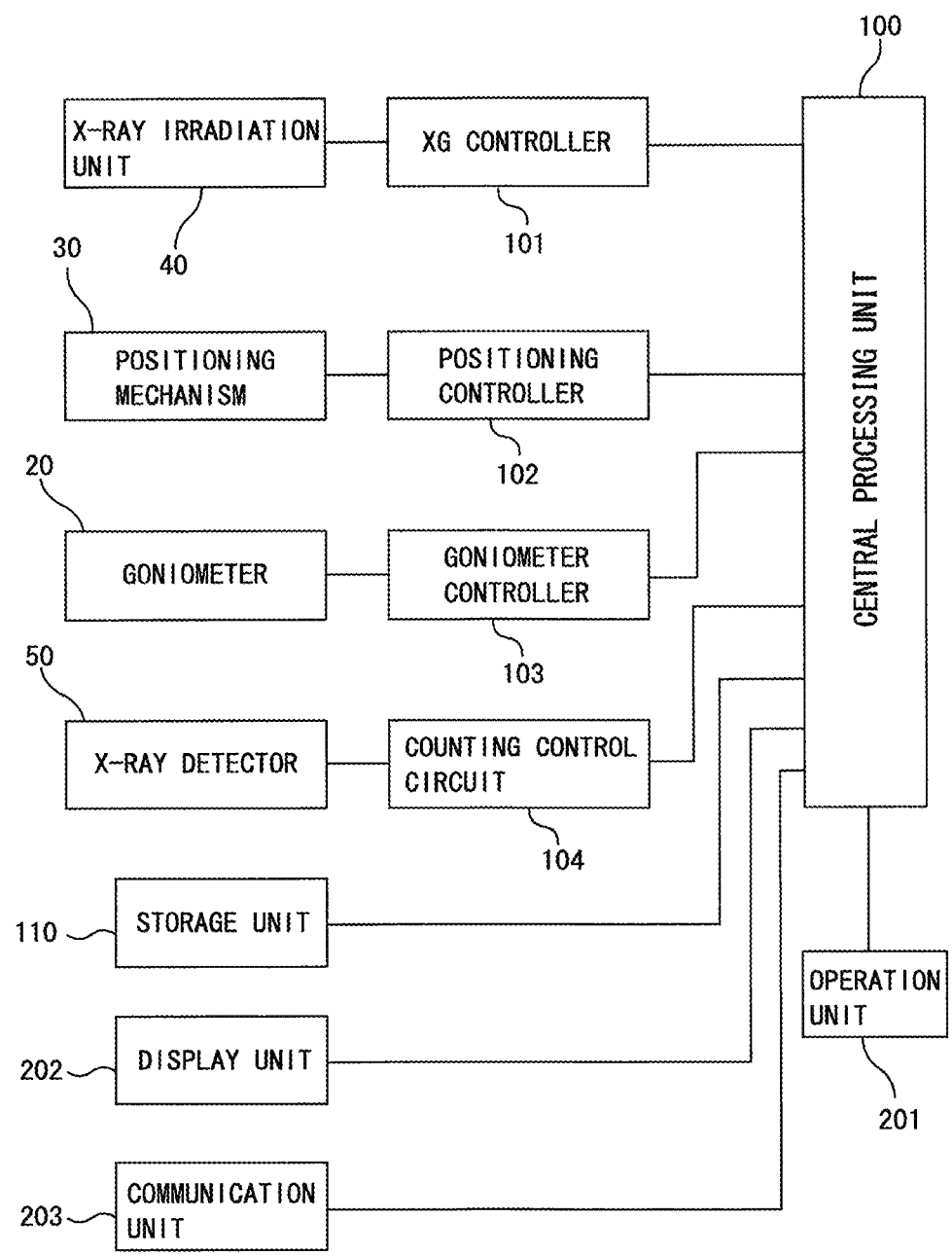
FIG. 8 is a block diagram showing a control system (controller) of the X-ray inspection device according to the embodiment of the present invention.

FIG. 8 is a block diagram showing a control system (controller) of the X-ray inspection device.

The control of the X-ray irradiation unit 40 is performed by an XG (X-ray Generator) controller 101.

A positioning controller 102 drives and controls the positioning mechanism 30.

The goniometer 20 is driven and controlled by a goniometer controller 103.

Each of respective components of the XG controller 101, the positioning controller 102, and the goniometer controller 103 operates based on setting information sent from a central processing unit (CPU) 100. Here, the setting information is stored as a recipe in a storage unit 110 in advance, and it is read out by the central processing unit (CPU) 100 and output to each of the above-mentioned components.

The X-ray detector 50 is controlled by a counting control circuit 104.

Each of these components and the central processing unit 100 is configured by a computer and installed in the storage unit 110 in advance, and executes each control operation according to a control program.

Further, the X-ray inspection device is equipped with an operation unit 201 including a keyboard, a mouse and the like for allowing an operator to input various settings necessary for the operation of the device. Further, the X-ray inspection device is equipped with a display unit 202 including a liquid crystal display or the like, and a communication unit 203 that executes data communication via a network.

[In-Plane X-Ray Diffraction Measurement]

Next, the function of in-plane X-ray diffraction measurement of the X-ray inspection device having the above-described configuration will be described.

Figure 9:
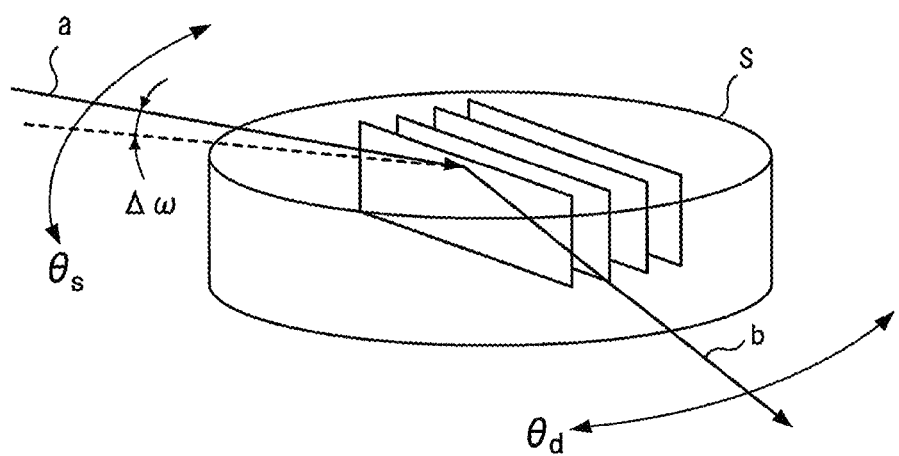
FIG. 9 is a conceptual diagram showing an in-plane X-ray diffraction measurement.

The in-plane X-ray diffraction measurement is a method of causing X-rays a to be barely incident to the surface of a thin film sample S and measuring diffracted X-rays b diffracted at crystal lattice planes orthogonal to the surface of the thin film sample S according to the Bragg's law as shown in FIG. 9. This in-plane X-ray diffraction measurement makes it possible to obtain information regarding the size and orientation of a crystal in a direction orthogonal to the surface of the thin film sample S.

The control system (controller) shown in FIG. 8 includes a control function of controlling the positioning mechanism 30, the goniometer 20, and the X-ray irradiation unit 40 to perform the in-plane diffraction measurement.

In other words, a control program for performing the in-plane X-ray diffraction measurement is installed in advance in the storage unit 110 of the control system (controller) shown in FIG. 8. Further, setting information necessary for the in-plane X-ray diffraction measurement is stored as a recipe in the storage unit 110 in advance. The central processing unit (CPU) 100 reads out necessary setting information according to the control program and outputs it to each component of the control system.

Figure 10B:
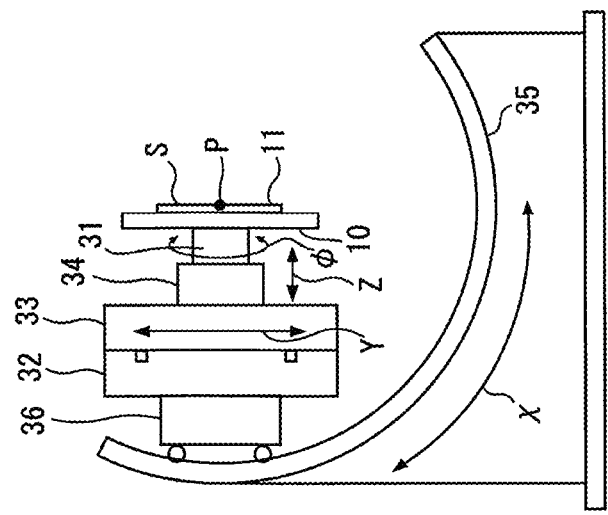
FIG. 10B is a side view of the same.
Figure 10A:
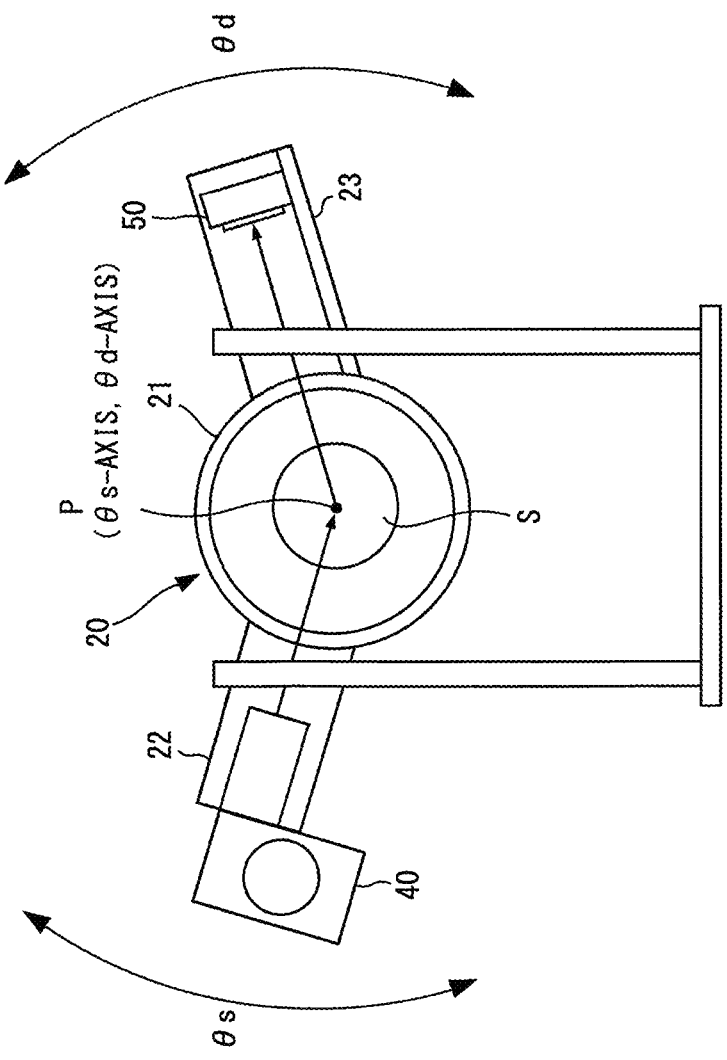
FIG. 10A is a front view which corresponds to FIG. 2 and shows a procedure for performing the in-plane X-ray diffraction measurement by the X-ray inspection device according to the embodiment of the present invention.
Figure 11:
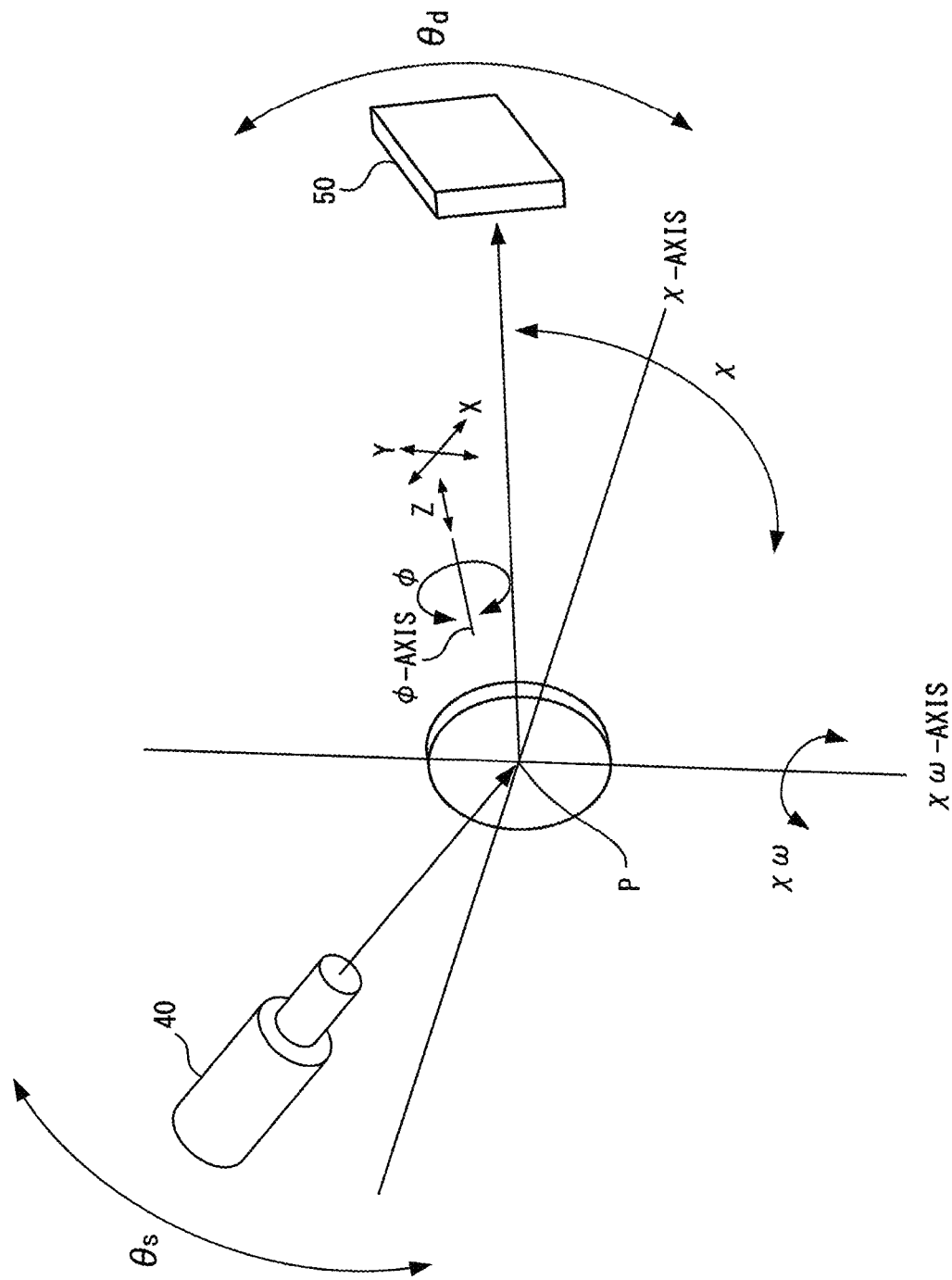
FIG. 11 is a schematic diagram which corresponds to FIG. 3 and shows a procedure for performing the in-plane X-ray diffraction measurement by the X-ray inspection device according to the embodiment of the present invention.

Specifically, as shown in FIGS. 10A, 10B, and 11, the in-plane diffraction measurement can be performed in a state where the surface of the sample S placed in the sample placement unit 11 is oriented vertically.

In other words, the positioning controller 102 drives and controls the χ rotation mechanism 35 constituting the positioning mechanism 30 to vertically orient the surface of the sample S placed in the sample placement unit 11.

Next, the positioning controller 102 drives and controls the Z movement mechanism 34 to align the inspection target site of the sample S placed in the sample placement unit 11 with the height of the measurement point P. Further, the positioning controller 102 drives and controls the φ rotation mechanism 31, the X movement mechanism 32, and the Y movement mechanism 33 to position the inspection target site of the sample S at the measurement point P under a preset orientation.

Further, the positioning controller 102 drives and controls the χω rotation mechanism 36 so that the incident X-rays a from the X-ray irradiation unit 40 is adjusted to be incident to the surface of the sample S at a grazing angle (Δω). The reason why a minute angle is set in the incident direction of the X-rays a with respect to the surface of the sample S is to irradiate the crystal lattice planes with the X-rays from the surface of the sample S while the X-rays are absorbed little.

In combination, the goniometer controller 103 drives and controls the θs rotation mechanism of the goniometer 20 to set the incident angle of the X-rays a from the X-ray irradiation unit 40 to the sample S.

In this state, the XG controller 101 controls the X-ray irradiation unit 40 to irradiate the sample S with the X-rays a. Inside the sample S, X-rays are diffracted according to the Bragg's law at crystal lattice planes orthogonal to the sample surface. Then, the diffracted X-rays b appear from the surface of the sample S.

The goniometer controller 103 drives and controls the θd rotation mechanism of the goniometer 20 to arrange the X-ray detector 50 at a position where the diffracted X-rays b appearing from the surface of the sample S are detected. The X-ray detector 50 is controlled by the counting control circuit 104 to detect the diffracted X-rays b.

According to the X-ray inspection device of the present embodiment, the X-ray irradiation unit 40 can irradiate the sample S with the X-rays a that are focused on a minute area with high resolution. Therefore, X-ray diffraction measurement can be performed by irradiating the sample S with a bundle of X-rays a within the focusing angle range thereof in a lump. Further, by adopting a two-dimensional X-ray detector as the X-ray detector 50, a bundle of diffracted X-rays b which have been diffracted in a certain angle range in connection with the bundle of X-rays a in the focusing angle range can be detected in a lump, and the measurement time can be shortened.

[Rocking Curve Measurement of In-Plane Diffraction]

Next, the function of rocking curve measurement of in-plane diffraction provided in the X-ray inspection device having the above configuration will be described.

As described above, the in-plane diffraction is a diffraction phenomenon which occurs at the crystal lattice planes orthogonal to the surface of the thin film sample S according to the Bragg's law as shown in FIG. 9 when X-rays are caused to be incident to the crystal lattice planes.

Figure 12:
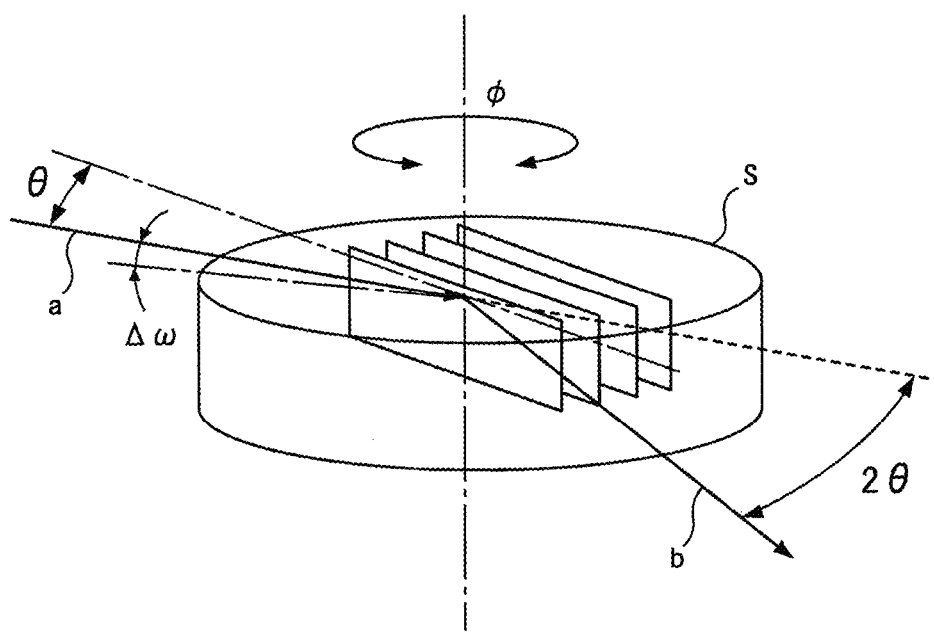
FIG. 12 is a conceptual diagram showing a rocking curve measurement of in-plane diffraction.

For a sample S having an orientation within planes thereof, the in-plane orientation of the sample S can be evaluated by performing the rocking curve measurement with focusing on such in-plane diffraction. In other words, as shown in FIG. 12, by minutely rotating the sample S in an in-plane direction (φ direction) and performing the rocking curve measurement, it is possible to evaluate the degree of variation in the crystal orientation of the rotation direction.

Specifically, when X-rays are caused to be incident to the crystal lattice planes orthogonal to the surface of the thin film sample S at an angle θ, the X-ray detector 50 is fixed in a direction in which the X-rays are diffracted from the lattice planes according to the Bragg's law (an angle direction of 2θ with respect to the optical axis of the incident X-rays). In this state, the sample S is minutely rotated in the in-plane direction (φ direction), and the rocking curve measurement is performed.

The control system (controller) shown in FIG. 8 has a control function of controlling the positioning mechanism 30, the goniometer 20, and the X-ray irradiation unit 40 to perform rocking curve measurement of in-plane diffraction.

In other words, the control program for performing the rocking curve measurement of in-plane diffraction is installed in advance in the storage unit 110 of the control system (controller) shown in FIG. 8, and the setting information necessary for the measurement described above is stored as a recipe in advance. The central processing unit (CPU) 100 reads out necessary setting information according to the control program and outputs it to each component of the control system.

Specifically, as shown in FIGS. 10A, 10B, and 11, the rocking curve measurement of in-plane diffraction can be performed while the surface of the sample placed in the sample placement unit 11 is oriented vertically.

In other words, the positioning controller 102 drives and controls the χ rotation mechanism 35 constituting the positioning mechanism 30 to vertically orient the surface of the sample placed in the sample placement unit 11.

Next, the positioning controller 102 drives and controls the Z movement mechanism 34 to align the inspection target site of the sample S placed in the sample placement unit 11 with the height of the measurement point P. Further, the positioning controller 102 drives and controls the φ rotation mechanism 31, the X movement mechanism 32, and the Y movement mechanism 33 to position the inspection target site of the sample S at the measurement point P under a preset orientation.

Further, the positioning controller 102 drives and controls the χω rotation mechanism 36 so that the incident X-rays from the X-ray irradiation unit 40 are adjusted to be incident to the surface of the sample S at a grazing angle (Δω).

In combination, the goniometer controller 103 drives and controls the θs rotation mechanism of the goniometer 20 to set the incident angle of the X-rays a from the X-ray irradiation unit 40 to the sample S. At the same time, the goniometer controller 103 drives and controls the θd rotation mechanism of the goniometer 20 to place the X-ray detector 50 at a position where diffracted X-rays appearing from the sample S according to the Bragg's law are detected.

In this state, the XG controller 101 controls the X-ray irradiation unit 40 to irradiate the sample S with X-rays a. Then, the counting control circuit 104 controls the X-ray detector 50 to detect diffracted X-rays b appearing from the surface of the sample S by the X-ray detector 50.

Further, the goniometer controller 103 drives and controls the θs rotation mechanism of the goniometer 20 to change the incident angle of the X-rays to the sample S. This operation of changing the incident angle corresponds to the operation of minutely rotating the sample S in the in-plane direction (φ direction) in FIG. 12. With this operation, the rocking curve measurement of in-plane diffraction is performed.

In FIG. 12, the operation of minutely rotating the sample S in the in-plane direction (φ direction) may also be performed by driving and controlling the φ rotation mechanism 31 shown in FIGS. 10A, 10B and 11 by the positioning controller 102 and also controlling the X movement mechanism 32 and the Y movement mechanism 33 so that the X movement mechanism 32 and the Y movement mechanism 33 interlock with the driving of the φ rotation mechanism 31.

In the X-ray inspection device having the above-described configuration according to the present embodiment, since the φ rotation mechanism 31 is installed just below the sample stage 10 (see FIGS. 2A and 2B), when the X movement mechanism 32 and the Y movement mechanism 33 are driven and controlled to position the measurement target site of the sample S at the measurement point P, the φ rotation mechanism 31 may be moved in the XY direction together with the sample S, so that the φ-axis may be deviated from the measurement point P. Therefore, a rotation angle at the measurement point P during minute rotation around the φ-axis deviated from the measurement point P is necessary to be corrected to a rotation angle in a state where no deviation occurs.

Therefore, the X movement mechanism 32 and the Y movement mechanism 33 are driven and controlled interlockingly together with the φ rotation mechanism 31, thereby correcting the rotation operation in the φ direction.

Further, according to the X-ray inspection device of the present embodiment, the X-ray irradiation unit 40 can irradiate the sample S with the X-rays a that are focused on a minute area with high resolution, so that the X-ray diffraction measurement can be performed by irradiating the sample S with a bundle of X-rays a within the focusing angle range thereof in a lump. Further, by adopting a two-dimensional X-ray detector as the X-ray detector 50, a bundle of diffracted X-rays b which have been diffracted in a certain angle range in connection with the bundle of X-rays a in the focusing angle range can be detected in a lump. Therefore, as shown in FIG. 12, it is also possible to perform the rocking curve measuring method of in-plane diffraction in a short time without minutely rotating the sample S in the in-plane direction (φ direction).

Generally, in the rocking curve measuring method for a sample S in which a thin film crystal is epitaxially grown on a substrate crystal, the incident angle θ of X-rays to the sample surface is changed within a range of 2° or more. Therefore, with respect to X-rays to be irradiated from the X-ray irradiation unit 40 to the sample surface, it is preferable that the focusing angle thereof is set to 2° or more by the focusing slit 44 to irradiate the surface of the sample with X-rays in the angle range of 2° or more.

Note that as described above, when the rocking curve measurement of in-plane diffraction is performed by minutely rotating the sample S in the in-plane direction (φ direction), a slit or the like may be provided to narrow down the X-rays to be irradiated to the sample S.

Specific Example of Rocking Curve Measurement of In-Plane Diffraction

The X-ray inspection device according to the present invention can perform the rocking curve measurement using in-plane diffraction, for example, on a SiGe (silicon germanium) epitaxial thin film or the like formed on a substrate.

For example, according to the X-ray inspection device of the present invention, the following rocking curve measurement of in-plane diffraction can be performed on a SiGe thin film (SGOI: SiGe on Insulator) on a $SiO_2$ thin film formed on a silicon substrate as a measurement target.

For example, a SiGe thin film is crystal-grown on a silicon substrate in which an Si (100) plane is parallel to a substrate surface, irradiated with oxygen ions, and then subjected to a high temperature treatment under an appropriate condition to form a $SiO_2$ film between the silicon substrate and the SiGe film, thereby manufacturing SGOI.

With respect to SiGe of SGOI produced as described above, the lattice constant in the lateral direction is relaxed more than Si due to the presence of the $SiO_2$ film. On the other hand, if the condition for forming the $SiO_2$ film is not appropriate, there is a risk that dislocation occurs. In other words, in order to evaluate and control the crystal quality of SGOI, it is extremely important to measure the lattice constant in the lateral direction of SiGe with high accuracy.

In other words, it is apparent that it is extremely significant to enable evaluation of X-ray diffraction for the lattice planes perpendicular to the substrate surface, that is, enable the in-plane diffraction measurement to performed.

Further, since the SiGe thin film has a very small thickness of about several tens nm, X-rays having a high incident angle are transmitted through the SiGe thin film, and thus sufficient diffraction lines cannot be obtained.

On the other hand, in the case of the in-plane diffraction, X-rays are barely incident to the substrate surface, so that there is an advantage that sufficient diffraction lines can be detected and the accuracy of the data can be secured.

As an example of the SiGe lattice planes perpendicular to the substrate surface, the rocking curve measurement on SiGe (400) may be performed according to the following procedure.

A substrate on which SGOI is formed (sample S) is placed and fixed on the sample stage 10, and the χ rotation mechanism 35 is driven to position the substrate approximately perpendicular to the horizontal plane. When the substrate is completely parallel to the X-ray incident direction, X-rays cannot enter the substrate, and thus the χ rotation mechanism 35 or χω rotation mechanism 36 is driven and adjusted to place the substrate so that X-rays can be barely incident to the substrate.

Next, after the X movement mechanism 32 and the Y movement mechanism 33 are driven to determine a measurement point, the φ rotation mechanism 31 or the goniometer 20 is driven and adjusted, and the substrate and the X-ray irradiation unit 40 are set at an angle at which X-rays are subjected to Bragg reflection at the Si crystal lattice planes (400).

This setting makes it possible to detect peak intensities of diffracted X-rays reflected from the (400) planes of the Si substrate crystal and diffracted X-rays reflected from the SiGe (400) planes in a direction which is slightly deviated from that of the former diffracted X-rays. The X-ray detector 50 is arranged so that the diffracted X-rays from the Si substrate crystal and the diffracted X-rays from SiGe can be detected in a lump.

Since the X-ray irradiation unit 40 can irradiate the surface with monochromatic X-rays to be focused on a minute area with high resolution, it is possible to irradiate the substrate with a bundle of X-rays in the focusing angle range in a lump. Therefore, the rocking curve measurement can be performed in an extremely short time without scanning the X-ray irradiation unit 40, the X-ray detector 50, the substrate, and the like.

Of course, it is also possible to measure the rocking curve by narrowing down the divergence angle of the X-rays from the X-ray source with a beam slit or the like and scanning the goniometer having the X-ray source installed therein.

On the other hand, as described above, since the two-dimensional detector is used as the X-ray detector 50 in the X-ray inspection device according to the present embodiment, it is not essential to scan the X-ray detector 50 in accordance with the X-ray source. Further, the rocking curve measurement can also be performed by scanning the φ rotation mechanism 31, the X movement mechanism 32, and the Y movement mechanism 33 around the measurement point of the sample as a rotation center while driving and adjusting them.

According to the X-ray inspection device of the present invention, as described above, the rocking curve measurement based on in-plane diffraction can be performed on the SiGe epitaxial thin film and the like with high accuracy and at high speed, and it is possible to play a very important role for analysis and management of the crystal quality of the thin film.

[Pole Measurement]

Next, the function of a pole measurement of the X-ray inspection device having the above-described configuration will be described.

Figure 13:
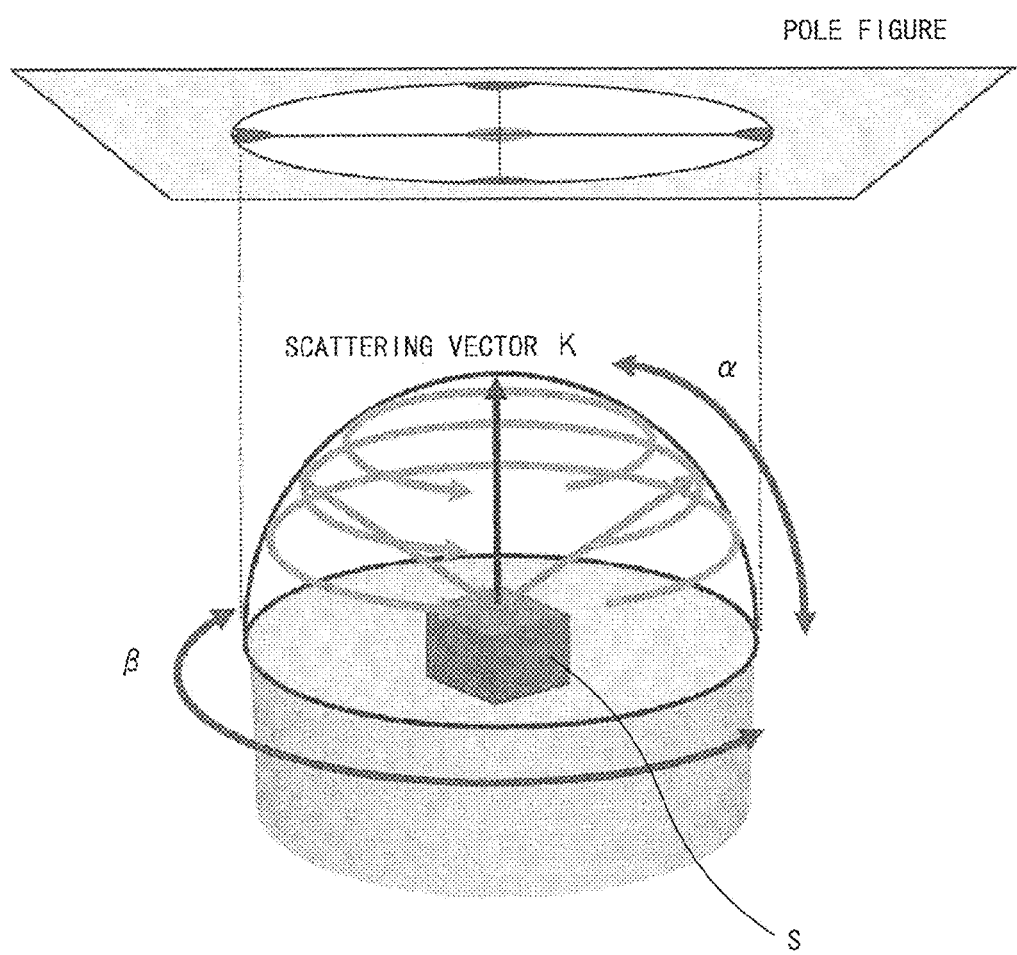
FIG. 13 is a conceptual diagram showing a pole measurement.

In the pole measurement, as shown in FIG. 13, attention is paid on certain crystal lattice planes of the sample S, two parameters of a tilt angle α and an in-plane rotation angle β of the sample S are changed, X-rays are made incident to the sample S in various directions, and diffracted X-rays diffracted from crystal lattice planes are measured. Then, an intensity distribution of the diffracted X-rays is drawn on a pole figure with α and β as parameters, and the positions of α and β where the diffraction lines are observed are analyzed on the pole figure. This measurement method is the pole measurement.

By this pole measurement, it is possible to evaluate the crystal orientations of thin film materials, especially polycrystalline thin films, the orientations thereof, etc.

The control system (controller) shown in FIG. 8 includes a control function of controlling the positioning mechanism 30, the goniometer 20, and the X-ray irradiation unit 40 to perform the pole measurement.

In other words, a control program for performing the pole measurement is installed in advance in the storage unit 110 of the control system (controller) shown in FIG. 8. Furthermore, setting information required for the pole measurement is stored as a recipe in advance in the storage unit 110. The central processing unit (CPU) 100 reads out necessary setting information according to the control program and outputs it to each component of the control system.

Specifically, the positioning controller 102 drives and controls the χ rotation mechanism 35 constituting the positioning mechanism 30 to rotate the surface of the sample S placed in the sample placement unit 11 about the χ-axis, whereby the tilt angle α of the pole measurement is changed within a range of 0° to 90°.

In addition, the positioning controller 102 drives and controls the φ rotation mechanism 31 constituting the positioning mechanism 30 to rotate the surface of the sample S placed in the sample placement unit 11 about the φ-axis, whereby the in-plane rotation angle β of the pole measurement is changed.

In this way, the XG controller 101 controls the X-ray irradiation unit 40 fixed at a certain position to irradiate the sample S with X-rays a. Then, the counting control circuit 104 controls the X-ray detector 50 so that the X-ray detector 50 detects diffracted X-rays diffracted from the sample at a certain position.

Note that the present invention is not limited to the above-described embodiment, and it is needless to say that various other modifications and applications can be made.

For example, the X-ray inspection device according to the above-described embodiment targets a semiconductor wafer flowing through a semiconductor manufacturing line for inspection. However, the present invention is not limited to this mode, and is also applicable to, for example, X-ray inspection in which a minute site of a semiconductor element is set as a measurement target site in a post-processing of the semiconductor manufacturing line.

Further, in the above-described embodiment, the functions of the in-plane X-ray diffraction measurement, the rocking curve measurement of in-plane diffraction, and the pole measurement have been described. However, it is needless to say that the X-ray inspection device of the present invention is not limited to these measurements, and can be applied to normal X-ray diffraction measurement, rocking curve measurement, X-ray reflectivity measurement, reciprocal lattice map measurement, etc.

Figure 14B:
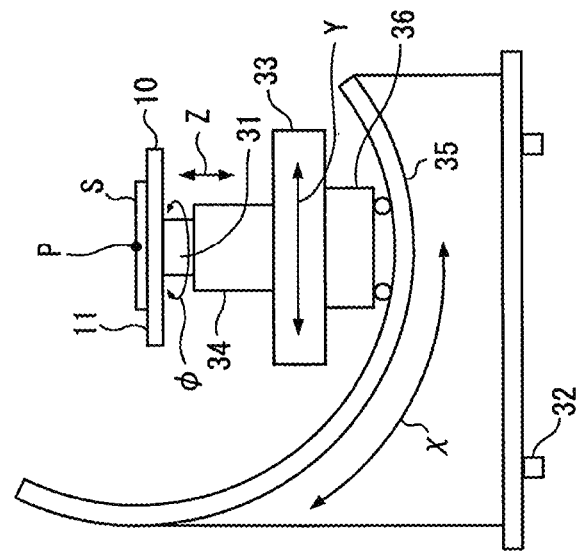
FIG. 14B is a side view of the same.
Figure 14A:
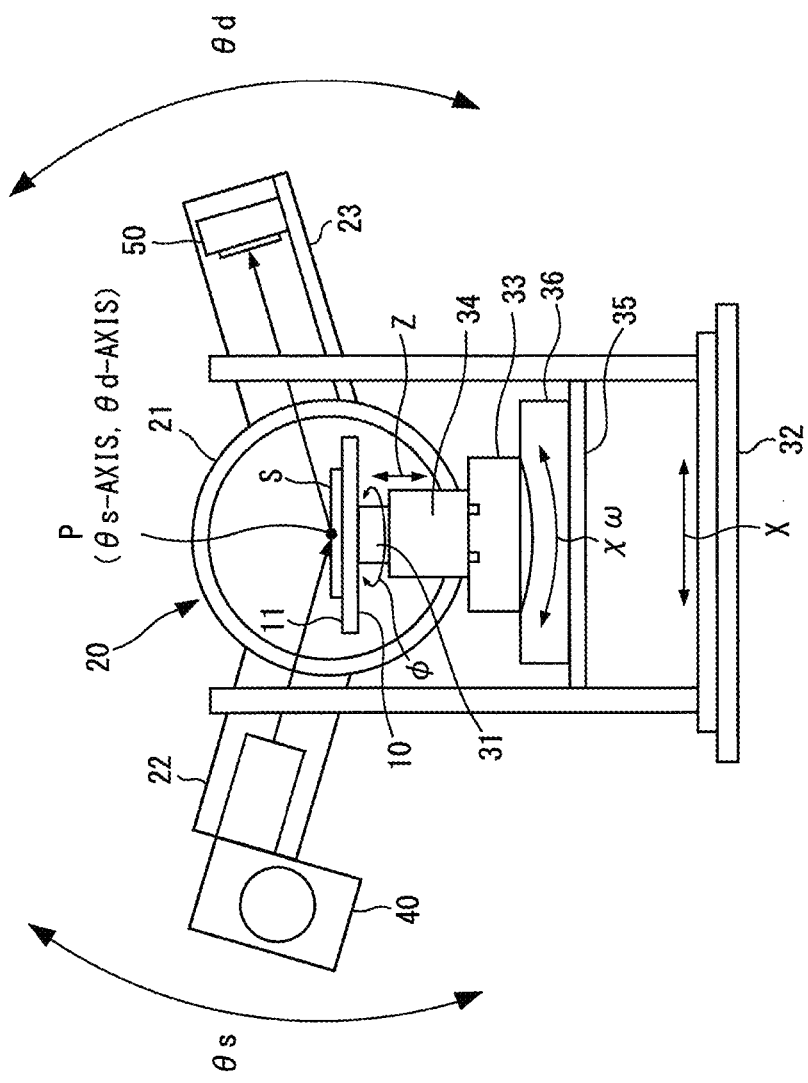
FIG. 14A is a front view schematically showing another configuration example of the X-ray inspection device according to the embodiment of the present invention.

Further, the X-ray inspection device shown in FIGS. 2A and 2B is configured so that the X movement mechanism 32 is provided between the Y movement mechanism 33 and the χω rotation mechanism 36, but it may be configured so that as shown in FIGS. 14A and 14B, the X movement mechanism 32 is provided below the χ rotation mechanism 35, and not only the sample stage 10, the φ rotation mechanism 31, the Z movement mechanism 34 and the Y movement mechanism 33, but also the χω rotation mechanism 36 and the χ rotation mechanism 35 are also moved linearly in the X direction.

The invention claimed is:
1. An X-ray inspection device comprising:
a sample placement unit for placing a sample as an inspection target;
a sample placement unit positioning mechanism for moving the sample placement unit;
a goniometer including first and second rotation members that rotate independently of each other;
an X-ray irradiation unit that is installed on the first rotation member and irradiates X-rays focusing onto a preset measurement point; and
a two-dimensional X-ray detector installed on the second rotation member,
wherein the goniometer includes a θs rotation mechanism for rotating the first rotation member around a θs-axis that passes through the measurement point and extends in a horizontal direction to set an incident angle of X-rays from the X-ray irradiation unit to the sample placed in the sample placement unit, and a θd rotation mechanism for rotating the second rotation member around a θd-axis coincident with the θs-axis to set a scanning angle of the X-ray detector, wherein the sample placement unit positioning mechanism includes a φ rotation mechanism for rotating the sample placement unit around a φ-axis orthogonal to a surface of the sample placed in the sample placement unit, an X movement mechanism for linearly moving the sample placement unit and the φ-axis in an X direction intersecting perpendicularly to the θs-axis and the θd-axis, a Y movement mechanism for linearly moving the sample placement unit and the φ-axis in a Y direction intersecting perpendicularly to the X direction, a Z movement mechanism for moving the sample placement unit in a Z direction orthogonal to the surface of the sample placed in the sample placement unit, a χ rotation mechanism for rotating the sample placement unit and the φ-axis around a χ-axis that is orthogonal to the θs-axis and the θd-axis at the measurement point and extends in the horizontal direction, and a χω rotation mechanism that rotates the sample placement unit and the φ-axis around a χω-axis that is orthogonal to the χ-axis at the measurement point and extends in parallel to the surface of the sample placed in the sample placement unit, and is rotated around the χ-axis by the χ rotation mechanism, and wherein the X-ray irradiation unit is configured to focus X-rays in a lateral direction that intersects perpendicularly to an optical axis of the X-rays and is parallel to the θs-axis, and also focus X-rays in a longitudinal direction that intersects perpendicularly to an optical axis of the X-rays and intersects perpendicularly to the θs-axis.

2. The X-ray inspection device according to claim 1, wherein the X-ray irradiation unit is configured to focus X-rays within 100 μm or less, to full width at half maximum of the peak, in each of the lateral direction and the longitudinal direction at the measurement point.

3. The X-ray inspection device according to claim 1, wherein the Y movement mechanism is configured so that a direction (Y direction) in which the sample placement unit is moved in a state where the sample placement unit is horizontally arranged by the χ rotation mechanism is parallel to the θs-axis and the θd-axis, and functions as a sample exchange mechanism for arranging the sample placement unit at a preset sample exchange position by moving the sample placement unit in the Y direction.

4. The X-ray inspection device according to claim 1, further comprising a controller having a control function of controlling the sample placement unit positioning mechanism, the goniometer including the first and second rotation members, and the X-ray irradiation unit to perform a rocking curve measurement of in-plane diffraction, wherein the controller has a control function of driving the χ rotation mechanism to vertically orient the surface of the sample placed in the sample placement unit, driving the Z movement mechanism to align an inspection target site of the sample placed in the sample placement unit with a height of the measurement point, driving φ the rotation mechanism, the X movement mechanism and the Y movement mechanism to position the inspection target site of the sample at the measurement point in a preset direction, further driving the θs rotation mechanism and the χω rotation mechanism to irradiate X-rays from the X-ray irradiation unit in a direction that is nearly parallel to the surface of the sample, driving the θd rotation mechanism interlockingly with the θs rotation mechanism to arrange the two-dimensional X-ray detector at a position where diffracted X-rays appearing from the sample according to Bragg's law are detected, and driving the θs rotation mechanism to change an incident angle of X-rays to the sample and perform a rocking curve measurement of in-plane diffraction.

5. The X-ray inspection device according to claim 1, further comprising a controller having a control function of controlling the sample placement unit positioning mechanism, the goniometer including the first and second rotation members, and the X-ray irradiation unit to perform a rocking curve measurement of in-plane diffraction, wherein the controller has a control function of driving the χ rotation mechanism to vertically orient the surface of the sample placed in the sample placement unit, driving the Z movement mechanism to align an inspection target site of the sample placed in the sample placement unit with a height of the measurement point, driving φ the rotation mechanism, the X movement mechanism and the Y movement mechanism to position the inspection target site of the sample at the measurement point in a preset direction, further driving the θs rotation mechanism to irradiate X-rays from the X-ray irradiation unit in a direction that is nearly parallel to the surface of the sample, driving the θd rotation mechanism interlockingly with the θs rotation mechanism to arrange the two-dimensional X-ray detector at a position where diffracted X-rays appearing from the sample according to Bragg's law are detected, and driving the φ rotation mechanism and interlocking the X movement mechanism and the Y movement mechanism the driving of the φ rotation mechanism to change an incident angle of X-rays to the sample while holding an inspection target site of the sample at the measurement point, thereby performing a rocking curve measurement of in-plane diffraction.

6. The X-ray inspection device according to claim 1, further comprising a controller having a control function of controlling the sample placement unit positioning mechanism, the goniometer including the first and second rotation members, and the X-ray irradiation unit to perform a rocking curve measurement of in-plane diffraction, wherein the controller has a control function of driving the χ rotation mechanism to vertically orient the surface of the sample placed in the sample placement unit, driving the Z movement mechanism to align an inspection target site of the sample placed in the sample placement unit with a height of the measurement point, driving the φ rotation mechanism, the X movement mechanism and the Y movement mechanism to position the inspection target site of the sample at the measurement point in a preset direction, further driving the θ rotation mechanism and the χω rotation mechanism to irradiate X-rays from the X-ray irradiation unit in a direction that is nearly parallel to the surface of the sample, driving the θd rotation mechanism interlockingly with the θs rotation mechanism to arrange the two-dimensional X-ray detector at a position where diffracted X-rays appearing from the sample according to Bragg's law are detected, and performing a rocking curve measurement of in-plane diffraction within a range of a focusing angle of X-rays that are focused and incident from the X-ray irradiation unit to the sample.

7. The X-ray inspection device according to claim 1, further comprising a controller having a control function of controlling the sample placement unit positioning mechanism, the goniometer including the first and second rotation members, and the X-ray irradiation unit to perform an in-plane diffraction measurement, wherein the controller has a control function of driving the χ rotation mechanism to vertically orient the surface of the sample placed in the sample placement unit, driving the Z movement mechanism to align an inspection target site of the sample placed in the sample placement unit with a height of the measurement point, driving the φ rotation mechanism, the X movement mechanism and the Y movement mechanism to position the inspection target site of the sample at the measurement point in a preset direction, further driving the θs rotation mechanism and the χω rotation mechanism to irradiate X-rays from the X-ray irradiation unit in a direction that is nearly parallel to the surface of the sample, and driving the θd rotation mechanism interlockingly with the θs rotation mechanism to arrange the two-dimensional X-ray detector at a position where diffracted X-rays appearing from the sample according to Bragg's law are detected, thereby performing an in-plane diffraction measurement.

8. The X-ray inspection device according to claim 1, further comprising a controller having a control function of controlling the sample placement unit positioning mechanism, the goniometer including the first and second rotation members, and the X-ray irradiation unit to perform a pole measurement, wherein the controller has a control function of driving the χ rotation mechanism to rotate the surface of the sample placed in the sample placement unit about the χ-axis, thereby setting a tilt angle α for the pole measurement within a range of 0° to 90°, and driving the φ rotation mechanism to rotate the surface of the sample placed in the sample placement unit about the φ-axis, thereby setting an in-plane rotation angle β for the pole measurement, whereby the pole measurement is performed.

\* \* \* \* \*